US012615692B2

(12) United States Patent
Yang et al.

(10) Patent No.: US 12,615,692 B2
(45) Date of Patent: Apr. 28, 2026

(54) METHOD AND APPARATUS FOR HANDLING UNICAST CONNECTION ESTABLISHMENT ABNORMALITY

(71) Applicant: Shenzhen Yinwang Intelligent Technologies Co., Ltd., Shenzhen (CN)

(72) Inventors: Miao Yang, Beijing (CN); Mingchao Li, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 269 days.

(21) Appl. No.: 18/426,254

(22) Filed: Jan. 29, 2024

(65) Prior Publication Data

US 2024/0172330 A1     May 23, 2024

Related U.S. Application Data

(63) Continuation of application No. PCT/CN2022/104228, filed on Jul. 6, 2022.

(30) Foreign Application Priority Data

Aug. 19, 2021     (CN) .......................... 202110955602.2

(51) Int. Cl.
*H04W 76/40*          (2018.01)
*H04W 24/08*          (2009.01)
*H04W 76/11*          (2018.01)

(52) U.S. Cl.
CPC ........... *H04W 76/40* (2018.02); *H04W 24/08* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 2007/0104109 | A1 | 5/2007 | Jiang |
| 2017/0094512 | A1 | 3/2017 | Kiss et al. |

(Continued)

FOREIGN PATENT DOCUMENTS

| | | |
|---|---|---|
| CN | 106603740 A | 4/2017 |
| CN | 109982450 A | 7/2019 |

(Continued)

OTHER PUBLICATIONS

"Internet Security Association and Key Management Protocol," Wikipedia, Last edited May 2020, XP93203618, total 3 pages (Jun. 2020).

*Primary Examiner* — Fadi Haj Said

(74) *Attorney, Agent, or Firm* — Leydig, Voit & Mayer, Ltd.

(57)          ABSTRACT

A second device sends a first message to a first device to request the first device to establish a unicast connection to the second device. The first message carries a medium access control (MAC) address, an address identifier, and a security mechanism of the second device. The first device determines, based on the first message, that establishment of the unicast connection between the first device and the second device is abnormal, and sends a second message to the second device. The second message carries the MAC address, the address identifier, and an error identifier of the second device, so that the second device performs corresponding handling based on a reason why establishment of the unicast connection is abnormal that is indicated by the error identifier.

30 Claims, 13 Drawing Sheets

(56)     References Cited

U.S. PATENT DOCUMENTS

| | | | | |
|---|---|---|---|---|
| 2020/0229262 A1* | 7/2020 | Jung | ..................... | H04W 76/11 |
| 2021/0227620 A1* | 7/2021 | Pan | ......................... | H04W 4/40 |
| 2021/0344555 A1* | 11/2021 | Peng | ................... | H04L 41/0677 |

FOREIGN PATENT DOCUMENTS

| | | | |
|---|---|---|---|
| CN | 110248347 | A | 9/2019 |
| CN | 111278165 | A | 6/2020 |
| CN | 111866796 | A | 10/2020 |
| CN | 112118326 | A | 12/2020 |
| WO | 2020150495 | A1 | 7/2020 |

* cited by examiner

METHOD AND APPARATUS FOR HANDLING UNICAST CONNECTION ESTABLISHMENT ABNORMALITY

CROSS-REFERENCE TO RELATED APPLICATIONS

This application is a continuation of International Application No. PCT/CN2022/104228, filed on Jul. 6, 2022, which claims priority to Chinese Patent Application No. 202110955602.2, filed on Aug. 19, 2021. The disclosures of the aforementioned applications are hereby incorporated by reference in their entireties.

TECHNICAL FIELD

This application relates to the field of internet of vehicles communication, and in particular, to a method and an apparatus for handling a unicast connection establishment abnormality.

BACKGROUND

An internet of vehicles (IoV) technology can implement exchange and sharing of intelligent information (for example, road condition information or service information) between a vehicle and X (a person, a vehicle, a road, a cloud, or the like). This greatly facilitates communication between the vehicle and X.

For a unicast service for communication between the vehicle and X, when a sender of a unicast service advertisement establishes a unicast connection to a responder of the unicast service advertisement, a conflict may occur in medium access control MAC addresses of a plurality of responders, security mechanisms of the two communication parties may not match, or another case may occur. As a result, establishment of the unicast connection between the sender and the responder is affected, interaction based on a unicast service is disordered, and the service cannot be normally executed.

SUMMARY

This application discloses a method and an apparatus for handling a unicast connection establishment abnormality, to effectively resolve a problem that establishment of a unicast connection is abnormal, improve efficiency of establishing a unicast connection, and ensure smooth execution of a unicast service between two communication parties.

According to a first aspect, this application provides a method for handling a unicast connection establishment abnormality, applied to a first device. The method includes: receiving a first message sent by a second device, where the first message is used to request the first device to establish a unicast connection to the second device, and the first message carries a first medium access control MAC address, an address identifier, and a security mechanism of the second device; determining, based on the first message, that establishment of the unicast connection between the second device and the first device is abnormal; and sending a second message to the second device, where the second message carries the first MAC address, the address identifier, and an error identifier, and the error identifier indicates a reason why establishment of the unicast connection is abnormal.

The first device may be a road side unit (RSU), multi-access edge computing (MEC), an on board unit (OBU), a smart gas station, a smart signal light, a portable mobile device (for example, a mobile phone or a tablet), or another sensor or device that has a communication function, for example, a component or a chip in a portable mobile device. For another example, the first device may alternatively be a system including an RSU and MEC, or a system including an RSU and a sensor, or a system including an RSU, MEC, and a sensor. The second device may be an on board unit, a smart gas station, a smart signal light, a portable mobile device (for example, a mobile phone or a tablet), or another sensor or device that has a communication function, for example, a component or a chip in a portable mobile device. This is not specifically limited in embodiments of this application.

A security mechanism is a security mode or a security protection method used by a device during communication. The security mechanism may be a security mechanism based on a symmetric key, a security mechanism based on a certificate, or the like. This is not specifically limited in embodiments of this application.

The address identifier may identify the second device. The address identifier may be a device identifier of the second device, a random number, a character string generated based on the MAC address and the device identifier of the second device, or the like. This is not specifically limited in embodiments of this application.

In the foregoing method, the first device can effectively distinguish, based on an address identifier, between different devices having a same MAC address, and can accurately indicate, based on the error identifier, a reason why establishment of the unicast connection between the second device and the first device is abnormal. In this way, a problem that establishment of the unicast connection is abnormal can be effectively resolved by using a message that carries content such as the address identifier and the error identifier. This improves efficiency of establishing the unicast connection, and ensures normal execution of a unicast service between the two communication parties.

Optionally, the determining, based on the first message, that establishment of the unicast connection between the second device and the first device is abnormal includes: determining, based on a determining result indicating that the first MAC address is the same as a second MAC address of a third device, that the first MAC address is the same as the second MAC address of the third device, where the third device is a device that requests to establish a unicast connection to the first device; determining, based on a determining result indicating that the security mechanism of the second device does not match a security mechanism supported by the first device, that the security mechanism of the second device does not match the security mechanism supported by the first device; or determining, based on a determining result indicating that a message structure of the first message is incorrect, that the message structure of the first message is incorrect.

If the first MAC address is the same as the second MAC address of the third device, it indicates that a conflict occurs in the first MAC address of the second device. As a result, establishment of the unicast connection is abnormal. If the security mechanism of the second device does not match the security mechanism supported by the first device, it indicates that the first device and the second device use different encryption and decryption manners for encrypting and decrypting information in an interaction process. As a result, establishment of the unicast connection is abnormal. If the message structure of the first message is incorrect, it indicates that the first device cannot parse or accurately parse the first message. As a result, establishment of the unicast connection is abnormal.

According to the foregoing implementation, in a unicast connection establishment process, that establishment of the unicast connection between the second device and the first device is abnormal and the reason why establishment of the unicast connection is abnormal can be quickly identified.

Optionally, when the second device is one device, that the first MAC address is one MAC address, and the second message carries the first MAC address includes: The first MAC address is carried in a destination MAC address field of the second message.

In the foregoing implementation, in the second message, the first MAC address is carried in a destination MAC address field of the second message, that is, the first MAC address is a destination layer 2 identifier destination layer 2 ID of the second message.

Optionally, that the second message carries the address identifier and the error identifier includes: The address identifier and the error identifier of the second device are carried in a header extension Header Extension field in a dedicated service advertisement DSA message frame of the second message; or the address identifier and the error identifier of the second device are carried in an application extension Application Extension field in a DSA message frame of the second message.

In the foregoing implementation, the second message carries the address identifier and the error identifier of the second device, so that the receive end of the second message can quickly determine, based on the address identifier, whether establishment of the unicast connection between the receive end of the second message and the first device is abnormal, and perform corresponding handling based on the reason why establishment of the unicast connection is abnormal that is indicated by the error identifier. This helps resolve a problem that establishment of the unicast connection between the two communication parties is abnormal.

Optionally, when the second device includes a plurality of devices, the first MAC address includes a plurality of MAC addresses, and the second message further includes a dedicated application identifier. The dedicated application identifier indicates that establishment of the unicast connection is abnormal, and the dedicated application identifier is carried in an application identifier AID field in a dedicated short message DSM message frame of the second message. A destination MAC address field of the second message carries a converted value of the dedicated application identifier.

In the foregoing implementation, when the second device includes a plurality of devices, when the destination MAC address field of the second message carries the converted value of the dedicated application identifier, it may be learned that the second message carries MAC addresses of the plurality of devices. In this way, a quantity of times of transmitting the second message can be reduced, and consumption of network resources can be effectively reduced.

Optionally, that the second message carries the first MAC address, the address identifier, and the error identifier includes: The first MAC address, the address identifier, and the error identifier are carried in a header extension Header Extension field in a dedicated service advertisement DSA message frame of the second message; or the first MAC address, the address identifier, and the error identifier are carried in an application extension Application Extension field in a DSA message frame of the second message.

In the foregoing implementation, when the second device includes a plurality of devices, the second message carries a plurality of MAC addresses, a plurality of address identifiers, and at least one error identifier, and one second message may notify a plurality of devices that establishment of unicast connections between the devices and the first device is abnormal. This helps improve efficiency of establishing the unicast connections, and effectively reduce consumption of network resources.

Optionally, in the first message, the address identifier of the second device is carried in at least one of a DSA identifier DSA Identifier field and a content count Content Count field in a dedicated service advertisement DSA message frame of the first message.

In the foregoing implementation, the first message carries the address identifier of the second device, and the address identifier may enable the receive end (namely, the first device) of the first message to effectively distinguish between different devices having a same MAC address.

Optionally, in the first message, the address identifier of the second device is carried in a header extension Header Extension field of a dedicated service advertisement DSA message frame of the first message.

In the foregoing implementation, the first message carries the address identifier of the second device, and the address identifier may enable the receive end (namely, the first device) of the first message to effectively distinguish between different devices having a same MAC address.

Optionally, the second message is sent by a network layer or an application layer of the first device.

The network layer is a network layer in a long term evolution (LTE)-based internet of vehicles wireless communication technology. A management sublayer at the network layer may be configured to complete functions such as system configuration and maintenance. A data sublayer at the network layer may be configured to transmit a data stream at the application layer and a data stream between different device management layer entities or between a management layer entity and an application. The application layer is an application layer in the LTE-based internet of vehicles wireless communication technology. The application layer is mainly configured to process application layer service logic, for example, generate an instant message or a unicast service advertisement. The network layer and the application layer may interact with each other by using a cross-layer primitive.

In a specific implementation, the network layer of the first device may send the second message, or the network layer of the first device may determine, based on the first message, that establishment of the unicast connection between the second device and the first device is abnormal, so that the unicast link establishment abnormality can be found more quickly and a response can be made quickly. In addition, consumption of upper-layer resources in the first device is reduced.

In another specific implementation, the application layer of the first device may determine, based on the first message, that establishment of the unicast connection between the second device and the first device is abnormal, and send the second message. This helps reduce data processing pressure of another layer in the first device, and a processing method is flexible.

According to a second aspect, this application provides a method for handling a unicast connection establishment abnormality, applied to a second device. The method includes: sending a first message to a first device, where the first message is used to request the first device to establish a unicast connection to the second device, and the first message carries a first medium access control MAC address, a first address identifier, and a security mechanism of the second device; receiving a second message sent by the first device, where the second message carries at least one MAC address, at least one address identifier, and an error identifier, and the error identifier indicates a reason why establishment of the unicast connection is abnormal; determining, based on the second message, that establishment of a unicast connection between the second device and the first device is abnormal; and performing an abnormality handling operation based on the error identifier.

For details about the first device and the second device, refer to the descriptions of the first device and the second device in the first aspect. Details are not described herein again.

According to the foregoing method, for a problem that different devices with a same MAC cannot be distinguished, an address identifier is added to content carried in the first message, and the address identifier may identify the second device. The second device may accurately learn, based on the error identifier in the second message, the reason why establishment of the unicast connection between the second device and the first device is abnormal. Therefore, a problem that establishment of the unicast connection is abnormal is effectively resolved, efficiency of establishing the unicast connection is improved, and normal execution of a unicast service between the two communication parties is ensured.

Optionally, the performing an abnormality handling operation based on the error identifier may be: reselecting the first MAC address when the error identifier indicates that a conflict occurs in the first MAC address.

In the foregoing implementation, the problem that establishment of the unicast connection is abnormal due to a MAC conflict can be effectively resolved, and efficiency of establishing the unicast connection can be improved.

Optionally, the performing an abnormality handling operation based on the error identifier may be: reselecting the security mechanism of the second device when the error identifier indicates that the security mechanism of the second device does not match a security mechanism supported by the first device.

In the foregoing implementation, the problem that establishment of the unicast connection is abnormal due to mismatch of the security mechanisms can be effectively resolved, and efficiency of establishing the unicast connection can be improved.

Optionally, the performing an abnormality handling operation based on the error identifier may be: rechecking a message structure of the first message when the error identifier indicates that the message structure of the first message is incorrect.

In the foregoing implementation, the problem that establishment of the unicast connection is abnormal because the first message cannot be parsed, and efficiency of establishing the unicast connection can be improved.

Optionally, the determining, based on the second message, that establishment of a unicast connection between the second device and the first device is abnormal includes: when the at least one MAC address is the first MAC address and the at least one address identifier is the first address identifier, determining that establishment of the unicast connection between the second device and the first device is abnormal.

In the foregoing implementation, the MAC address and the address identifier carried in the second message can enable a receive end of the second message to uniquely determine that establishment of a unicast connection between the receive end of the second message and the first device is abnormal.

Optionally, that the second message carries at least one MAC address, at least one address identifier, and an error identifier includes: The at least one MAC address is carried in a destination MAC address field of the second message; and the at least one address identifier and the error identifier are carried in a header extension Header Extension field in a dedicated service advertisement DSA message frame of the second message, or the at least one address identifier and the error identifier are carried in an application extension Application Extension field in a DSA message frame of the second message.

In the foregoing implementation, the second message carries the address identifier and the error identifier, so that the receive end of the second message can quickly determine, based on the address identifier, whether establishment of the unicast connection between the receive end of the second message and the first device is abnormal, and perform corresponding handling based on a reason why establishment of the unicast connection is abnormal that is indicated by the error identifier. This helps resolve a problem that establishment of the unicast connection between the two communication parties is abnormal.

Optionally, the second message further includes a dedicated application identifier, the dedicated application identifier indicates that establishment of the unicast connection is abnormal, and the dedicated application identifier is carried in an application identifier AID field in a dedicated short message DSM message frame of the second message. The determining, based on the second message, that establishment of the unicast connection between the second device and the first device is abnormal may be: when content carried in a destination MAC address field of the second message includes a converted value of the dedicated application identifier, the at least one MAC address includes the first MAC address, and the at least one address identifier includes the first address identifier, determining that establishment of the unicast connection between the second device and the first device is abnormal.

In the foregoing implementation, when the destination MAC address field of the second message carries the converted value of the dedicated application identifier, it may be learned that the second message carries a plurality of MAC addresses and a plurality of address identifiers. When the second message carries the MAC address and the address identifier of the second device, the second device may quickly determine that establishment of the unicast connection between the second device and the first device is abnormal.

Optionally, that the second message carries at least one MAC address, at least one address identifier, and an error identifier includes: The at least one MAC address, the at least one address identifier, and the error identifier are carried in a header extension Header Extension field in a dedicated service advertisement DSA message frame of the second message; or the at least one MAC address, the at least one address identifier, and the error identifier are carried in an application extension Application Extension field in a DSA message frame of the second message.

In the foregoing implementation, the second message may carry a plurality of MAC addresses and a plurality of address identifiers. In this way, one second message may simultaneously notify a plurality of devices that establishment of unicast connections between the devices and the first device is abnormal. This helps improve efficiency of establishing the unicast connections, and effectively reduce consumption of network resources.

Optionally, in the first message, the first address identifier is carried in at least one of a DSA identifier DSA Identifier field and a content count Content Count field in a dedicated service advertisement DSA message frame of the first message.

In the foregoing implementation, the first message carries the first address identifier, and the address identifier may enable the receive end (namely, the first device) of the first message to effectively distinguish between different devices having a same MAC address.

Optionally, in the first message, the first address identifier is carried in a header extension Header Extension field of a dedicated service advertisement DSA message frame of the first message.

In the foregoing implementation, the first message carries the first address identifier, and the address identifier may enable the receive end (namely, the first device) of the first message to effectively distinguish between different devices having a same MAC address.

According to a third aspect, this application provides an apparatus for handling a unicast connection establishment abnormality. The apparatus includes: a receiving unit, configured to receive a first message sent by a second device, where the first message is used to request a first device to establish a unicast connection to the second device, and the first message carries a first medium access control MAC address, an address identifier, and a security mechanism of the second device; a processing unit, configured to determine, based on the first message, that establishment of the unicast connection between the second device and the first device is abnormal; and a sending unit, configured to send a second message to the second device, where the second message carries the first MAC address, the address identifier, and an error identifier, and the error identifier indicates a reason why establishment of the unicast connection is abnormal.

Optionally, the processing unit is configured to: determine, based on a determining result indicating that the first MAC address is the same as a second MAC address of a third device, that the first MAC address is the same as the second MAC address of the third device, where the third device is a device that requests to establish a unicast connection to the first device; determine, based on a determining result indicating that the security mechanism of the second device does not match a security mechanism supported by the first device, that the security mechanism of the second device does not match the security mechanism supported by the first device; or determine, based on a determining result indicating that a message structure of the first message is incorrect, that the message structure of the first message is incorrect.

Optionally, when the second device is one device, that the first MAC address is one MAC address, and the second message carries the first MAC address includes: The first MAC address is carried in a destination MAC address field of the second message.

Optionally, that the second message carries the address identifier and the error identifier includes: The address identifier and the error identifier of the second device are carried in a header extension Header Extension field in a dedicated service advertisement DSA message frame of the second message; or the address identifier and the error identifier are carried in an application extension Application Extension field in a DSA message frame of the second message.

Optionally, when the second device includes a plurality of devices, the first MAC address includes a plurality of MAC addresses, and the second message further includes a dedicated application identifier. The dedicated application identifier indicates that establishment of the unicast connection is abnormal, and the dedicated application identifier is carried in an application identifier AID field in a dedicated short message DSM message frame of the second message. A destination MAC address field of the second message carries a converted value of the dedicated application identifier.

Optionally, that the second message carries the first MAC address, the address identifier, and the error identifier includes: The first MAC address, the address identifier, and the error identifier are carried in a header extension Header Extension field in a dedicated service advertisement DSA message frame of the second message; or the first MAC address, the address identifier, and the error identifier are carried in an application extension Application Extension field in a DSA message frame of the second message.

Optionally, in the first message, the address identifier of the second device is carried in at least one of a DSA identifier DSA Identifier field and a content count Content Count field in a dedicated service advertisement DSA message frame of the first message.

Optionally, in the first message, the address identifier of the second device is carried in a header extension Header Extension field of a dedicated service advertisement DSA message frame of the first message.

Optionally, the second message is sent by a network layer or an application layer of the first device.

According to a fourth aspect, this application provides an apparatus for handling a unicast connection establishment abnormality. The apparatus includes: a sending unit, configured to send a first message to a first device, where the first message is used to request the first device to establish a unicast connection to a second device, and the first message carries a first medium access control MAC address, a first address identifier, and a security mechanism of the second device; a receiving unit, configured to receive a second message sent by the first device, where the second message carries at least one MAC address, at least one address identifier, and an error identifier, and the error identifier indicates a reason why establishment of the unicast connection is abnormal; and a processing unit, configured to determine, based on the second message, that establishment of the unicast connection between the second device and the first device is abnormal. The processing unit is further configured to perform an abnormality handling operation based on the error identifier.

Optionally, the processing unit is configured to reselect the first MAC address when the error identifier indicates that a conflict occurs in the first MAC address.

Optionally, the processing unit is configured to reselect the security mechanism of the second device when the error identifier indicates that the security mechanism of the second device does not match a security mechanism supported by the first device.

Optionally, the processing unit is configured to recheck a message structure of the first message when the error identifier indicates that the message structure of the first message is incorrect.

Optionally, the processing unit is configured to: when the at least one MAC address is the first MAC address and the at least one address identifier is the first address identifier, determine that establishment of the unicast connection between the second device and the first device is abnormal.

Optionally, that the second message carries at least one MAC address, at least one address identifier, and an error identifier includes: The at least one MAC address is carried in a destination MAC address field of the second message; and the at least one address identifier and the error identifier are carried in a header extension Header Extension field in a dedicated service advertisement DSA message frame of the second message, or the at least one address identifier and the error identifier are carried in an application extension Application Extension field in a DSA message frame of the second message.

Optionally, the second message further includes a dedicated application identifier, the dedicated application identifier indicates that establishment of the unicast connection is abnormal, and the dedicated application identifier is carried in an application identifier AID field in a dedicated short message DSM message frame of the second message. The processing unit is configured to: when content carried in a destination MAC address field of the second message includes a converted value of the dedicated application identifier, the at least one MAC address includes the first MAC address, and the at least one address identifier includes the first address identifier, determine that establishment of the unicast connection between the second device and the first device is abnormal.

Optionally, that the second message carries at least one MAC address, at least one address identifier, and an error identifier includes: The at least one MAC address, the at least one address identifier, and the error identifier are carried in a header extension Header Extension field in a dedicated service advertisement DSA message frame of the second message; or the at least one MAC address, the at least one address identifier, and the error identifier are carried in an application extension Application Extension field in a DSA message frame of the second message.

Optionally, in the first message, the first address identifier is carried in at least one of a DSA identifier DSA Identifier field and a content count Content Count field in a dedicated service advertisement DSA message frame of the first message.

Optionally, in the first message, the first address identifier is carried in a header extension Header Extension field of a dedicated service advertisement DSA message frame of the first message.

According to a fifth aspect, this application provides an apparatus. The apparatus includes a processor and a memory, the memory is configured to store program instructions, and the processor invokes the program instructions in the memory, to enable the apparatus to perform the method according to any one of the first aspect or the possible implementations of the first aspect.

According to a sixth aspect, this application provides an apparatus. The apparatus includes a processor and a memory, the memory is configured to store program instructions, and the processor invokes the program instructions in the memory, to enable the apparatus to perform the method according to any one of the second aspect or the possible implementations of the second aspect.

According to a seventh aspect, this application provides a computer-readable storage medium, including computer instructions. When the computer instructions are run by a processor, the method according to any one of the first aspect or the possible implementations of the first aspect is implemented.

According to an eighth aspect, this application provides a computer-readable storage medium, including computer instructions. When the computer instructions are run by a processor, the method according to any one of the second aspect or the possible implementations of the second aspect is implemented.

According to a ninth aspect, this application provides a computer program product. When the computer program product is executed by a processor, the method according to any one of the first aspect or the possible embodiments of the first aspect is implemented. For example, the computer program product may be a software installation package. When the method provided in any possible design of the first aspect needs to be used, the computer program product may be downloaded and executed on the processor, to implement the method according to any one of the first aspect or the possible embodiments of the first aspect.

According to a tenth aspect, this application provides a computer program product. When the computer program product is executed by a processor, the method according to any one of the second aspect or the possible embodiments of the second aspect is implemented. For example, the computer program product may be a software installation package. When the method provided in any possible design of the second aspect needs to be used, the computer program product may be downloaded and executed on the processor, to implement the method according to any one of the second aspect or the possible embodiments of the second aspect.

According to an eleventh aspect, this application provides a vehicle, including the apparatus according to the third aspect or the fifth aspect, or the apparatus according to any possible implementation of the third aspect or the fifth aspect, or the apparatus according to the fourth aspect or the sixth aspect, or the apparatus according to any possible implementation of the fourth aspect or the sixth aspect.

According to a twelfth aspect, this application provides a system for handling a unicast connection establishment abnormality, including a first device and a second device. The first device is the apparatus according to the third aspect or the fifth aspect, or the apparatus according to any possible implementation of the third aspect or the fifth aspect; and the second device is the apparatus according to the fourth aspect or the sixth aspect, or the apparatus according to any possible implementation of the fourth aspect or the sixth aspect.

DESCRIPTION OF EMBODIMENTS

Terms used in embodiments of this application are merely for the purpose of describing specific embodiments, but are not intended to limit this application. In the specification and claims in embodiments of this application, the terms "first", "second", and the like are intended to distinguish between different objects but do not indicate a particular order of the objects.

The following describes the technical solutions in this application with reference to the accompanying drawings.

Figure 1:
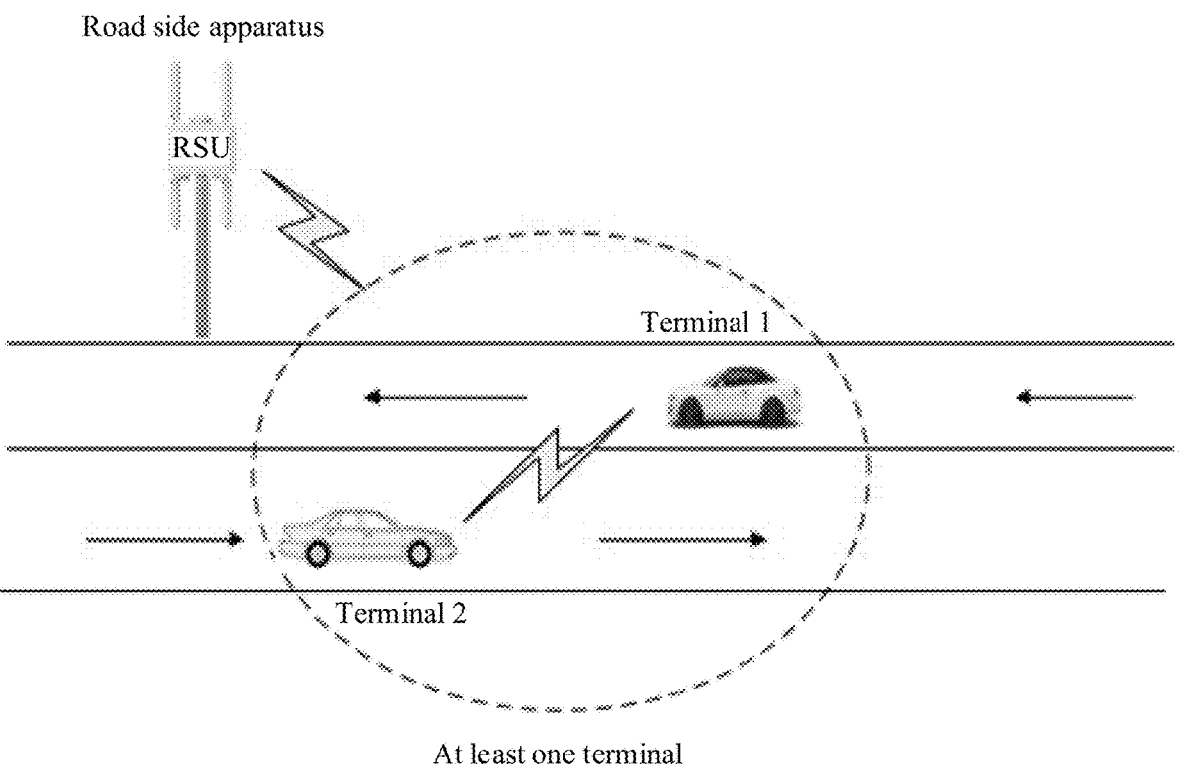
FIG. 1 is a diagram of an architecture of a communication system.

FIG. 1 is a schematic diagram of an architecture of a communication system. The communication system includes a road side apparatus and at least one terminal. The road side apparatus may communicate with the terminal, and terminals may communicate with each other in a wireless manner.

The road side apparatus may be a road side unit (RSU), or multi-access edge computing (MEC) with a wireless communication function, a smart gas station, a smart signal light, or the like. The terminal may be an on board unit (OBU), a portable mobile device (for example, a mobile phone or a tablet), or another sensor or device that can communicate with the road side apparatus or another terminal, for example, a component or a chip in a portable mobile device. This is not specifically limited in embodiments of this application.

In the system architecture shown in FIG. 1, the at least one terminal may include a terminal 1 and a terminal 2. The road side apparatus may separately establish unicast connections to the terminal 1 and the terminal 2, and a unicast connection may also be established between the terminal 1 and the terminal 2.

It should be noted that, in the system shown in FIG. 1, a cellular communication technology may be used for communication between the road side apparatus and the terminal, or between the terminals, for example, 2G cellular communication such as global system for mobile communications (GSM) and a general packet radio service (GPRS), or 3G cellular communication such as wideband code division multiple access (WCDMA), time division-synchronous code division multiple access (TS-SCDMA), code division multiple access (CDMA), or 4G cellular communication such as long term evolution (LTE), LTE-vehicle to everything (V2X) wireless communication technology PC5 communication, or 5G cellular communication such as new radio (NR)-V2X PC5 communication, or another evolved cellular communication technology. The wireless communication system may also communicate with a wireless local area network (WLAN) by using a non-cellular communication technology, for example, Wi-Fi. In some embodiments, the foregoing devices may alternatively directly communicate with each other through an infrared link, Bluetooth, or Zigbee. In some embodiments, the foregoing devices may alternatively communicate with each other by using other wireless protocols, for example, various vehicle communication systems. For example, the system may include one or more dedicated short-range communications (DSRC) devices. The devices may include public and/or private data communication between a vehicle and/or a road side station. This is not specifically limited in this application.

It should be noted that FIG. 1 is merely a diagram of an example architecture, but a quantity of network elements included in the communication system shown in FIG. 1 is not limited. In addition to functional entities shown in FIG. 1, another functional entity may be included in FIG. 1 although it is not shown in FIG. 1. In addition, the method provided in embodiments of this application may be applied to the communication system shown in FIG. 1. Certainly, the method provided in embodiments of this application may alternatively be applied to another communication system. This is not limited in embodiments of this application.

Figure 2:
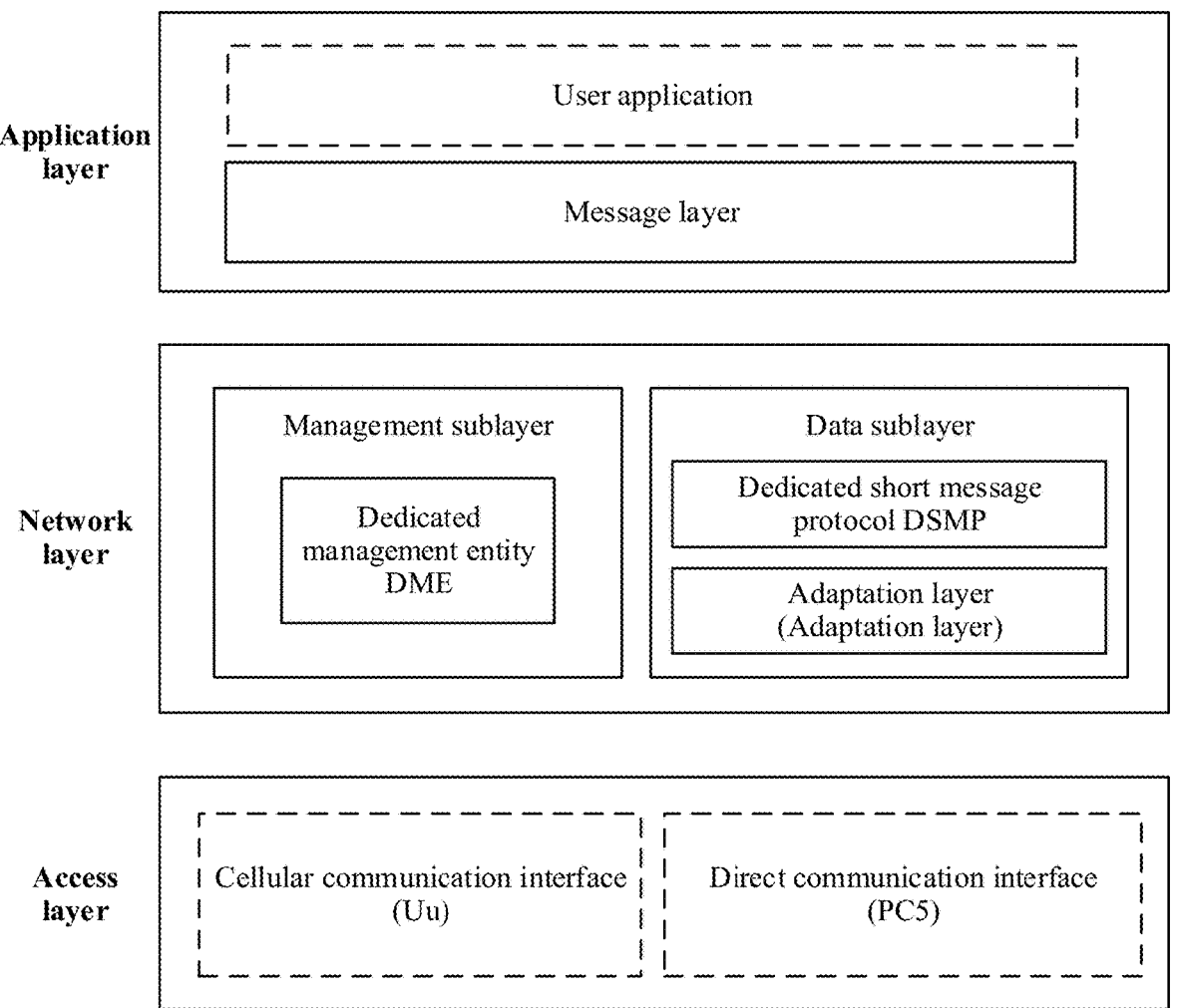
FIG. 2 is a schematic diagram of a protocol stack of an LTE-based internet of vehicles wireless communication technology.

Specifically, the terminal or the road side apparatus may establish a protocol stack shown in FIG. 2, and interaction may be performed between the terminals or between the terminal and the road side apparatus based on the protocol stack shown in FIG. 2. FIG. 2 is a schematic diagram of a protocol stack of an LTE-based internet of vehicles wireless communication technology.

The protocol stack includes an application layer, a network layer, and an access layer. The application layer is mainly configured to process application layer service logic of an application service, for example, generate an instant message and a unicast service advertisement. The application layer includes a user application layer and a message layer. The message layer is located inside the application layer. The message layer connects to a data sublayer and supports a specific user application. The message layer may support transmission of various types of data defined by the network layer of the LTE-based internet of vehicles wireless communication technology. Interaction between the message layer and the data sublayer inside the network layer is implemented by using a cross-layer primitive (also referred to as an operation primitive or a service primitive).

The network layer includes a management sublayer and the data sublayer. The management sublayer is configured to complete functions such as system configuration and maintenance, for example, selection of a MAC address and selection of a security mechanism. The management sublayer may be a dedicated management entity (DME). The DME provides a management interface for each entity at the data sublayer. The data sublayer transmits a data stream at the application layer, and also transmits a data stream between different device management layer entities, or between a management layer entity and an application. The data sublayer includes an adaptation layer, a dedicated short message protocol (DSMP) layer, and the like. The DSMP layer is configured to perform data interaction with different applications. The adaptation layer is configured to provide a transmission adaptation function between a bottom-layer access layer and an upper-layer protocol stack, for example, distinguish a bottom-layer interface used by a to-be-sent data packet (for example, a DSMP data packet and an IP (Internet Protocol) data packet), and transfer the corresponding data packet to a corresponding interface of the access layer for transmission. Functions of the adaptation layer further include generation/change/maintain of a source layer 2 identifier, mapping between a unicast/multicast address and a layer 2 identifier, and the like.

The access layer supports a cellular communication interface (for example, a Uu interface) and/or a direct communication interface (for example, a PC5 interface). The PC5 interface and the Uu interface may support different radio access technologies (RATs). For example, the RAT may include an LTE technology or an NR technology.

Figures 3, 4:
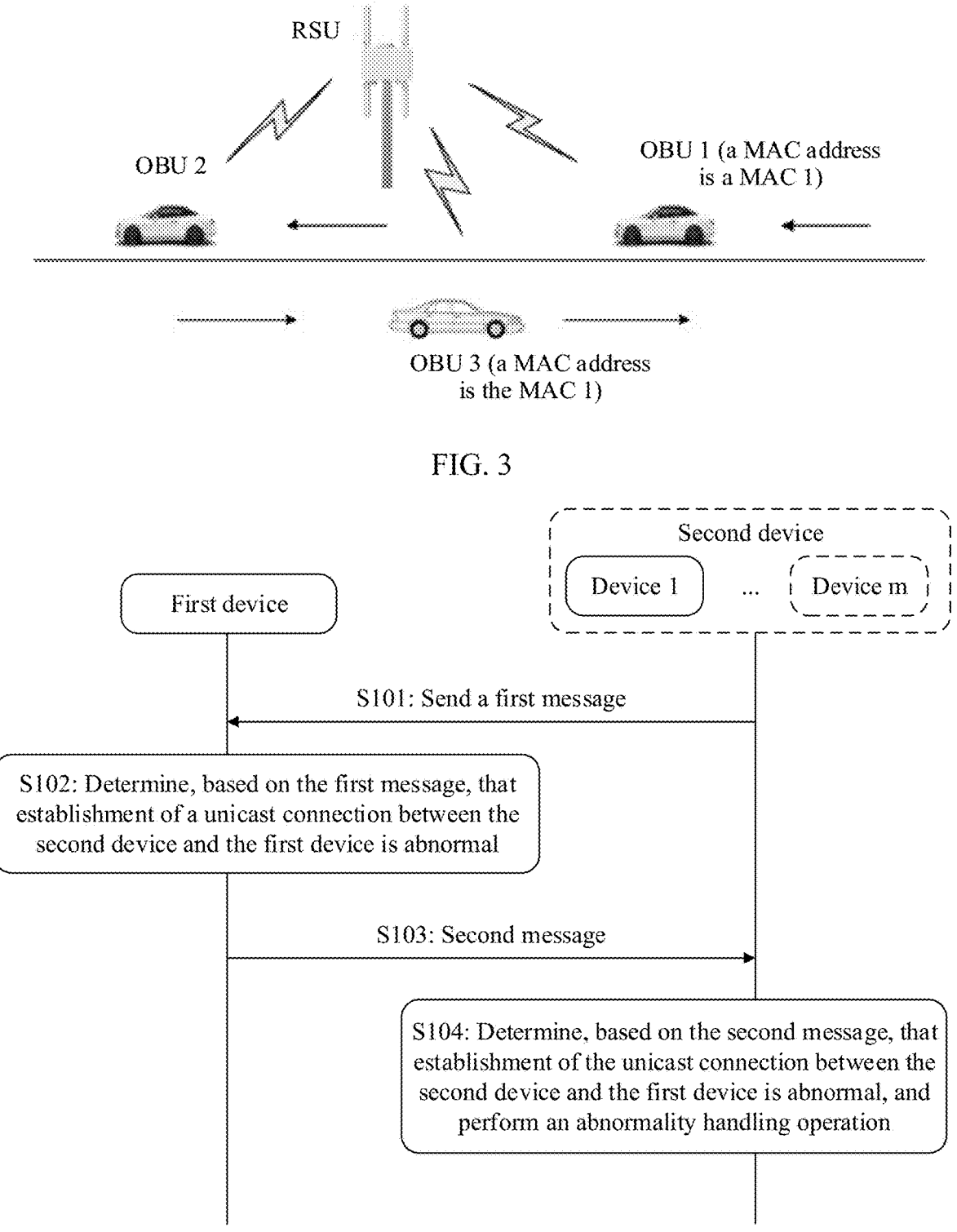
FIG. 3 is a schematic diagram of a scenario of establishing a unicast connection.
FIG. 4 is a flowchart of a method for handling a unicast connection establishment abnormality according to an embodiment of this application.

Refer to FIG. 3. For example, the road side apparatus is an RSU, and the terminal is an OBU is used. The at least one terminal includes an OBU 1, an OBU 2, and an OBU 3. The RSU may separately communicate with the OBU 1, the OBU 2, and the OBU 3, and MAC addresses of the OBU 1, the OBU 2, and the OBU 3 are randomly selected and used in a same address domain. It is assumed that the RSU periodically broadcasts a unicast service advertisement carrying a specified application service. Because the OBU 1, the OBU 2, and the OBU 3 are all within a broadcast range of the RSU, the OBU 1, the OBU 2, and the OBU 3 all can receive the unicast service advertisement of the RSU. After the OBU 1, the OBU 2, and the OBU 3 separately perform analysis with reference to their own service requirements, only the OBU 1 responds to the unicast service advertisement sent by the RSU, that is, the OBU 1 sends a response message to the RSU. The response message carries a MAC address (for example, a MAC 1) of the OBU 1. After receiving the response message sent by the OBU 1, the RSU finds that the MAC address of the OBU 1 is the same as a MAC address of the OBU 3, or the RSU does not support a security mechanism provided by the OBU 1. As a result, an abnormality occurs in unicast connection establishment. Consequently, a communication process is easily disordered, and normal execution of a service is affected.

For the foregoing problem, an embodiment of this application provides a method for handling a unicast connection establishment abnormality, to resolve a problem that establishment of a unicast connection is abnormal due to a MAC address conflict, mismatch of security mechanisms of two communication parties, or the like in a unicast connection establishment process. In this way, efficiency of establishing a unicast connection is improved, and normal execution of a unicast service between the two communication parties is ensured.

FIG. 4 shows a method for handling a unicast connection establishment abnormality according to an embodiment of this application. The method is applied to a system for handling a unicast connection establishment abnormality. The system includes a first device and a second device. The first device is the foregoing sender of a unicast service advertisement, and the second device is the foregoing responder. The method includes but is not limited to the following steps.

S101: The second device sends a first message to the first device.

In embodiments of this application, the first device first sends a broadcast message to the second device. The broadcast message may be a unicast service advertisement indicating a preset application service.

In embodiments of this application, after receiving the broadcast message, the second device determines, with reference to a service requirement of the second device, that the second device needs to establish a unicast connection that is based on the preset application service to the first device. In this case, the second device sends the first message to the first device. It may be understood that the first message is a response message for the broadcast message.

The second device may be one or more devices. For example, in FIG. 4, m is a positive integer greater than or equal to 1. When m is equal to 1, the second device is one device, namely, a device 1. In this case, for a specific process of interaction between the first device and the second device, refer to the following descriptions of an embodiment in FIG. 5. When m is greater than 1, the second device includes a plurality of devices, and includes a device 1, a device 2, . . . , and a device m. In this case, for a specific process of interaction between the first device and each device, refer to the following descriptions of an embodiment in FIG. 8. Details are not described herein.

In embodiments of this application, the first message is used to request the first device to establish the unicast connection to the second device. The first message carries a MAC address of the second device, an address identifier of the second device, and a security mechanism of the second device. The MAC address of the second device, the address identifier of the second device, and the security mechanism of the second device are determined by the second device.

In embodiments of this application, the MAC address of the second device is an address used by the second device to communicate with another device in a network. For example, the MAC address of the second device may be 24 bits, and is selected by the second device in an autonomous address selection manner.

In embodiments of this application, the security mechanism of the second device is a security mode used when the second device interacts with another device. The security mechanism of the second device includes but is not limited to a security mechanism based on a symmetric key, a security mechanism based on a certificate, and the like.

It may be understood that normal interaction between two communication parties can be ensured only when the two communication parties use a same security mechanism. For example, the security mechanism based on a symmetric key means that the two communication parties need to use same keys to encrypt and decrypt a message or data. It should be noted that the foregoing security mechanism has a wide application field in the communication field. Details are not described herein.

In embodiments of this application, the address identifier of the second device identifies the second device. The address identifier of the second device may be a randomly generated random number, or may be a device identifier of the second device, or may be a character string obtained through calculation based on the MAC address of the second device, a device identifier of the second device, and the like. This is not specifically limited herein.

In embodiments of this application, for details about a location at which the MAC address, the address identifier, and the security mechanism of the second device are carried in the first message, refer to the related descriptions in the following embodiment in FIG. 5. Details are not described herein.

S102: The first device determines, based on the first message, that establishment of the unicast connection between the second device and the first device is abnormal.

In embodiments of this application, that the first device receives the first message sent by the second device, and determines, based on the first message, that establishment of the unicast connection between the second device and the first device is abnormal includes:

(1) determining, based on a determining result indicating that the MAC address of the second device is the same as a MAC address of a third device, that establishment of the unicast connection between the second device and the first device is abnormal, where the third device is a device that requests to establish a unicast connection to the first device;

(2) determining, based on a determining result indicating that the security mechanism of the second device does not match a security mechanism supported by the first device, that establishment of the unicast connection between the second device and the first device is abnormal; or (3) determining, based on a determining result indicating that a message structure of the first message sent by the second device is incorrect, that establishment of the unicast connection between the second device and the first device is abnormal.

If the MAC address of the second device is the same as the MAC address of the third device, it indicates that a MAC address conflict occurs on the second device. If the security mechanism of the second device does not match the security mechanism supported by the first device, it indicates that the second device and the first device cannot communicate because of different information encryption and decryption manners. If the message structure of the first message sent by the second device is incorrect, it indicates that the first device cannot parse the first message sent by the second device. It should be noted that, in embodiments of this application, a condition for determining that the unicast establishment between the second device and the first device is abnormal is not limited to the foregoing listed conditions, and may be another condition that causes a unicast connection establishment failure.

It may be understood that when the second device is one device, if it is determined that establishment of the unicast connection between the second device and the first device is abnormal, the second device may be referred to as an abnormal device. When there are a plurality of second devices, whether establishment of a unicast connection between each device and the first device is abnormal may be determined according to the foregoing method, to determine that establishment of the unicast connection between each of the plurality of devices and the first device is abnormal. In this case, each of the plurality of devices may be referred to as an abnormal device.

S103: The first device sends a second message to the second device.

In embodiments of this application, the second message carries a MAC address, an address identifier, and an error identifier of the abnormal device, and the error identifier indicates a reason why establishment of the unicast connection is abnormal that is corresponding to the abnormal device. It should be noted that the error identifier may also be referred to as an error code.

In a specific implementation, when a value of the error identifier is a first value, it indicates that a MAC address conflict occurs on the abnormal device. Alternatively, when a value of the error identifier is a second value, it indicates that a security mechanism of the abnormal device does not match the security mechanism supported by the first device. Alternatively, when a value of the error identifier is a third value, it indicates that a message format of a first message sent by the abnormal device is incorrect. In some possible embodiments, when a value of the error identifier is a fourth value, it indicates that a MAC address conflict occurs on the abnormal device, a security mechanism of the abnormal device does not match the security mechanism supported by the first device, and the like. In another specific implementation, the error identifier may alternatively be indicated by bits. For example, 001 indicates that a MAC address conflict occurs on the abnormal device, 010 indicates that a security mechanism of the abnormal device does not match the security mechanism supported by the first device, 100 indicates that a message format of a first message sent by the abnormal device is incorrect, and 011 indicates that a MAC address conflict occurs on the abnormal device and a security mechanism of the abnormal device does not match the security mechanism supported by the first device. This is not specifically limited herein.

In embodiments of this application, when there is one abnormal device, the second message carries one MAC address. For details of this embodiment, refer to the related descriptions in the following embodiment in FIG. 5.

In embodiments of this application, when there are a plurality of abnormal devices, the second message carries a plurality of MAC addresses. For details of this embodiment, refer to the related descriptions in the following embodiment in FIG. 8.

In embodiments of this application, S102 and S103 may be performed by a network layer or an application layer of the first device. It should be noted that the network layer is a network layer in an LTE-based internet of vehicles wireless communication technology. For details, refer to the related descriptions of the network layer in FIG. 2. The application layer is an application layer in the LTE-based internet of vehicles wireless communication technology. For details, refer to the related descriptions of the application layer in FIG. 2. Details are not described herein again.

In a specific implementation, S102 and S103 may be performed by the network layer of the first device, for example, may be performed by a DME at the network layer of the first device. Specifically, after the DME at the network layer of the first device receives the first message sent by the second device, the DME of the first device determines, based on the first message, that establishment of the unicast connection between the second device and the first device is abnormal, and the DME of the first device triggers sending of the second message.

In a specific implementation, S102 and S103 may alternatively be performed by the application layer of the first device. Specifically, after the network layer of the first device receives the first message sent by the second device, the network layer of the first device sends data such as the MAC address, the address identifier, and the security mechanism in the first message to the application layer of the first device by using a cross-layer primitive. The application layer of the first device determines, based on the received data, that establishment of the unicast connection between the second device and the first device is abnormal, and the application layer of the first device triggers sending of the second message.

S104: The second device determines, based on the second message, that establishment of the unicast connection between the second device and the first device is abnormal, and performs an abnormality handling operation.

The following describes the solutions by using an example in which the second device is one device.

In embodiments of this application, when there is one abnormal device, it indicates that the second message carries one MAC address of the abnormal device. In this case, if the MAC address of the abnormal device is the MAC address of the second device and an address identifier of the abnormal device is the address identifier of the second device, it indicates that the second device is the abnormal device. Therefore, it is determined that establishment of the unicast connection between the second device and the first device is abnormal, and the second device performs an abnormality handling operation. For details of this embodiment, refer to the related descriptions in the following embodiment in FIG. 5. Details are not described herein.

In embodiments of this application, when there are a plurality of abnormal devices, it indicates that the second message carries a plurality of MAC addresses and a plurality of address identifiers. In this case, when determining that the second message is a unicast establishment abnormality message, the second device further determines that the plurality of MAC addresses carried in the second message include the MAC address of the second device and the plurality of address identifiers carried in the second message include the address identifier of the second device. Therefore, it is determined that establishment of the unicast connection between the second device and the first device is abnormal, and the second device performs an abnormality handling operation. For details of this embodiment, refer to the related descriptions in the following embodiment in FIG. 8. Details are not described herein.

In embodiments of this application, the abnormality handling operation may be performed by the network layer or the application layer of the second device. This is not specifically limited in embodiments of this application.

It can be learned that, in embodiments of this application, the sender can effectively distinguish between different responders with a same MAC address based on address identifiers. When determining that establishment of a unicast connection corresponding to a responder is abnormal, the sender may send a message carrying content such as an address identifier and an error identifier of the responder to notify the responder of a reason why establishment of the unicast connection is abnormal, so that the responder can perform corresponding handling. This effectively resolves a problem that establishment of the unicast connection between the sender and the responder is abnormal, improves efficiency of establishing the unicast connection, and ensures normal execution of a service between the two communication parties.

Figure 5:
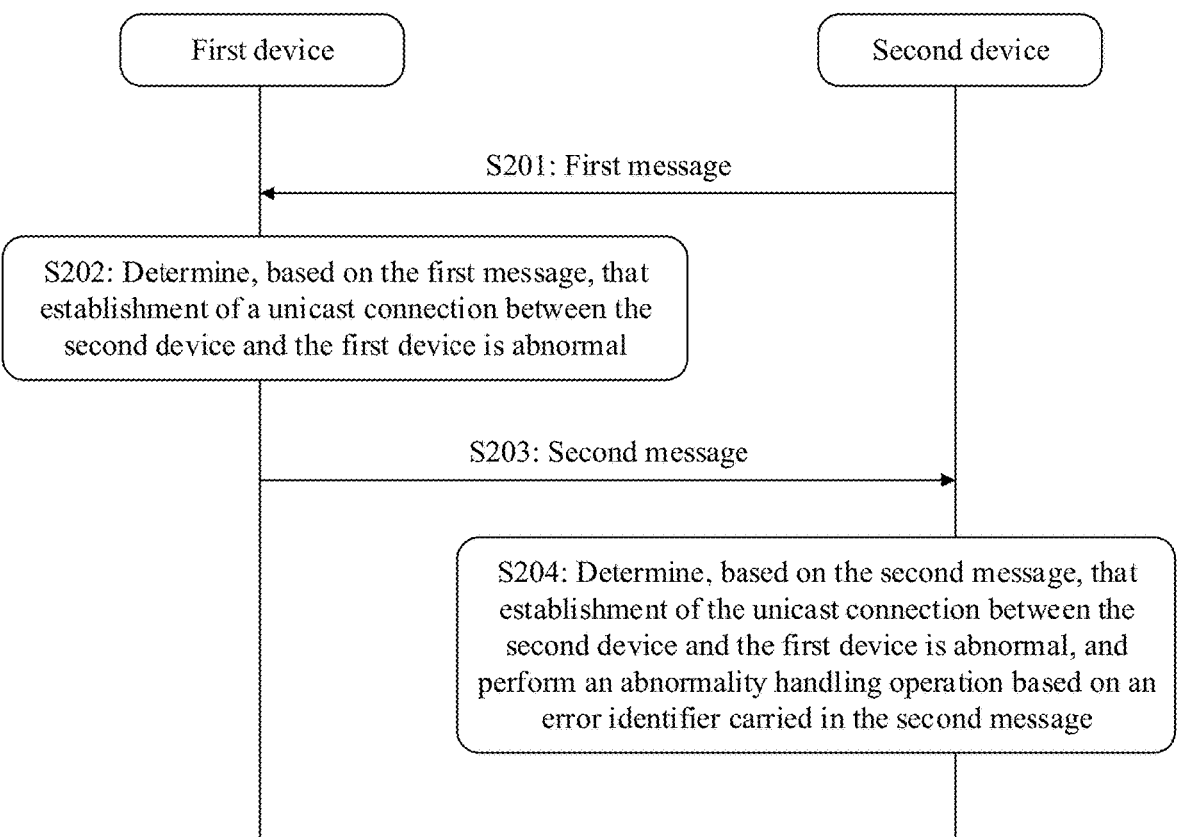
FIG. 5 is a flowchart of another method for handling a unicast connection establishment abnormality according to an embodiment of this application.

FIG. 5 shows a method for handling a unicast connection establishment abnormality according to an embodiment of this application. In comparison with that in FIG. 4, a second device in FIG. 5 is one device. The embodiment in FIG. 5 may be independent of the embodiment in FIG. 4, or may be a supplement to the embodiment in FIG. 4. The method includes but is not limited to the following steps.

S201: The second device sends a first message to a first device.

In embodiments of this application, the second device may send the first message to the first device in response to a unicast service advertisement sent by the first device. The first message is used to request the first device to establish a unicast connection to the second device, and the first message carries a MAC address, an address identifier, and a security mechanism of the second device.

The following describes a location at which the MAC address, the address identifier, and the security mechanism of the second device are carried in the first message.

In the first message, the address identifier of the second device is mainly carried in the first message in the following two manners.

Manner 1: The address identifier of the second device is carried in at least one of a dedicated service advertisement identifier field and a content count field in the first message.

In embodiments of this application, the address identifier of the second device may be carried in one or more of a DSA identifier field and a content count field in a dedicated service advertisement (DSA) message frame of the first message.

Figure 6A:
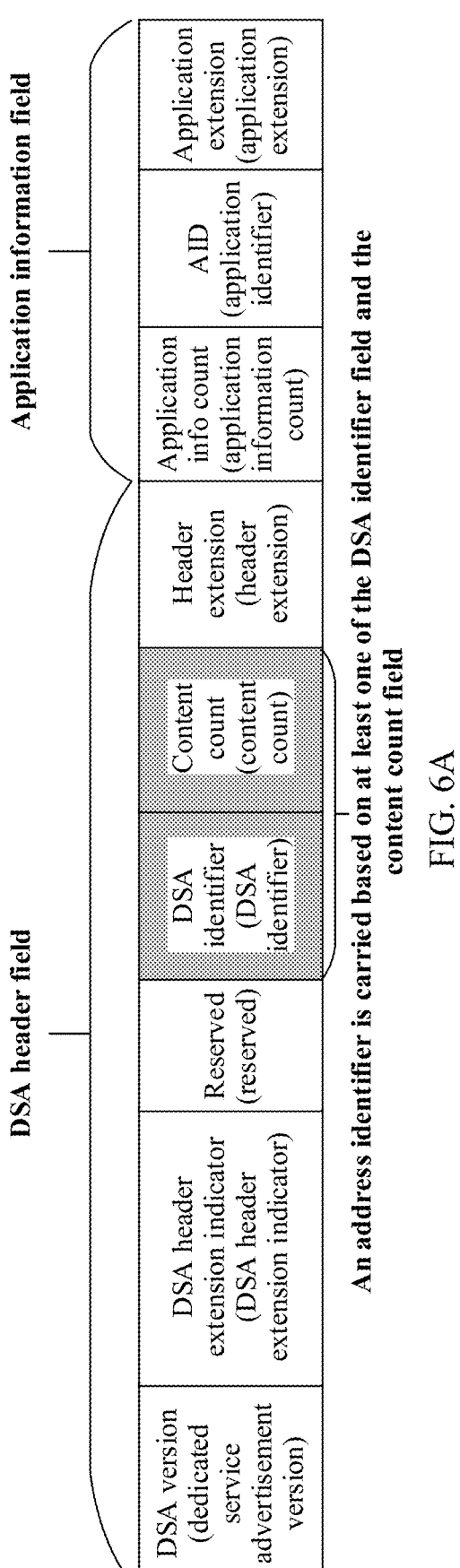
FIG. 6A is a schematic diagram in which an address identifier is carried in a first message according to an embodiment of this application.

FIG. 6A is a schematic diagram in which the address identifier is carried in the first message according to an embodiment of this application. FIG. 6A shows a format of the DSA message frame of the first message. The DSA message frame includes a DSA header field and an application information field.

In FIG. 6A, the DSA header field includes a dedicated service advertisement version (DSA Version) field, a DSA header extension indicator field, a reserved field, a DSA identifier field, a content count field, and a header extension field. When a value of the DSA header extension indicator field is 1, it indicates that a header extension field appears, or when a value of the DSA header extension indicator field is 0, it indicates that no header extension field appears. A reserved field may be used for function extension. The DSA identifier field indicates uniqueness of a DSA. The content count field may identify whether a previous DSA is repeated when DSA IDs are the same. The header extension field may be reserved for other information.

In FIG. 6A, the application information field includes an application information count (Application Info Count) field, an application identifier (AID) field, and an application extension field. The application info count field indicates a quantity of pieces of application information after the field. The AID field indicates a type of an application service. The application extension field indicates related information of the application service.

In a specific implementation, the address identifier of the second device may be carried in the DSA identifier field or the content count field in FIG. 6A. For example, if the address identifier of the second device is a 4-bit device identifier, the address identifier of the second device may be filled in the DSA identifier field or the content count field in the DSA message frame of the first message.

In another specific implementation, the address identifier of the second device may be carried in the DSA identifier field and the content count field in FIG. 6A. For example, if the address identifier of the second device is an 8-bit random number, the address identifier of the second device may be filled into the DSA identifier field and the content count field in the DSA message frame of the first message.

Manner 2: The address identifier of the second device is carried in a header extension field in the first message.

In embodiments of this application, the address identifier of the second device may be carried in a header extension Header Extension field in a DSA message frame of the first message.

Figure 6B:
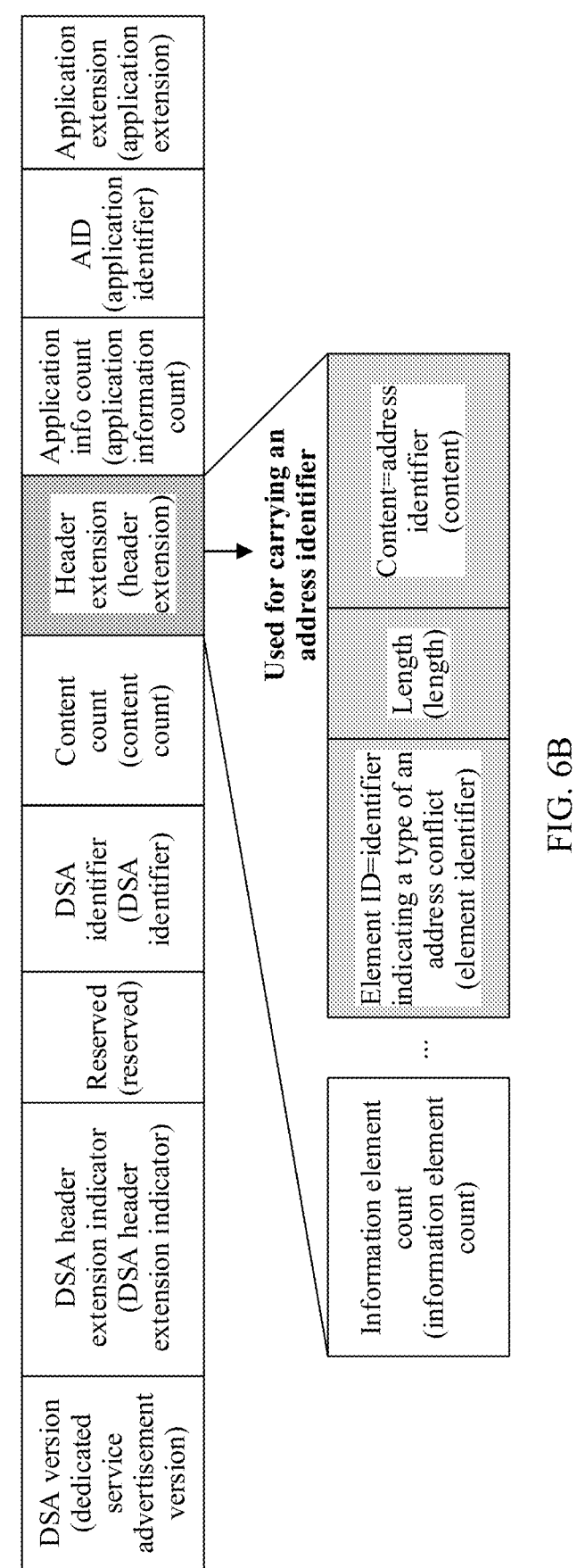
FIG. 6B is a schematic diagram in which an address identifier is carried in a first message according to an embodiment of this application.

FIG. 6B is a schematic diagram in which the address identifier is carried in the first message according to an embodiment of this application. In FIG. 6B, for details of the DSA message frame, refer to the related descriptions in FIG. 6A. Details are not described herein again. In the DSA message frame, the header extension field further includes an information element quantity field and at least one information element, and one information element may be indicated by one element ID field, one length length field, and one content content field. In FIG. 6B, the address identifier of the second device may be carried in the header extension field. Specifically, the address identifier of the second device may be carried in the header extension field by using a newly defined element ID. For example, an element ID field is defined to indicate a function identifier for detecting an address conflict, the content field is defined to indicate the address identifier of the second device, and the length field is defined to indicate a length of the address identifier of the second device.

In embodiments of this application, the MAC address of the second device is carried in a source MAC address field of the first message, that is, the MAC address of the second device is a source layer 2 identifier (Source Layer 2 ID) of the first message. Alternatively, the security mechanism of the second device may be carried in the header extension field in the DSA message frame of the first message. Details are not described herein again.

It should be noted that, after determining the MAC address and the address identifier of the second device, the second device may further store a mapping relationship between the MAC address of the second device and the address identifier of the second device.

S202: The first device determines, based on the first message, that establishment of the unicast connection between the second device and the first device is abnormal.

Specifically, a process in which the first device determines, based on the first message, that establishment of the unicast connection between the second device and the first device is abnormal may be: performing an operation, for example, determining whether the first message sent by the second device can be correctly parsed, determining, through comparison, whether the security mechanism of the second device matches a security mechanism supported by the first device, and detecting whether a MAC address of a third device is the same as the MAC address of the second device. The third device is a device that requests to establish a unicast connection to the first device, and the third device is different from the second device. If the first message cannot be parsed, it indicates that a message structure of the first message is incorrect. In this case, it is determined that establishment of the unicast connection between the second device and the first device is abnormal. If the security mechanism of the second device does not match the security mechanism supported by the first device, it is determined that establishment of the unicast connection between the second device and the first device is abnormal. If it is detected that the MAC address of the third device is the same as the MAC address of the second device, it indicates that a conflict occurs in the MAC address of the second device. In this case, it is determined that establishment of the unicast connection between the second device and the first device is abnormal. In some possible embodiments, various combinations of the following cases may alternatively exist: The first message cannot be parsed, the conflict occurs in the MAC address of the second device, and the security mechanism of the second device does not match the security mechanism supported by the first device. In this case, it may be determined that establishment of the unicast connection between the second device and the first device is abnormal.

In some possible embodiments, the first device successfully establishes the unicast connection to the second device if the second device meets all the following conditions: the message structure of the first message sent by the second device is correct, no conflict occurs in the MAC address of the second device, and the security mechanism of the second device matches the security mechanism supported by the first device.

S203: The first device sends a second message to the second device.

In embodiments of this application, when determining that establishment of the unicast connection between the second device and the first device is abnormal, the first device sends the second message to the second device. The second message carries the MAC address, the address identifier, and an error identifier of the second device, and the error identifier indicates a reason why establishment of the unicast connection is abnormal.

In the second message, the MAC address of the second device is carried in a destination MAC address field of the second message, that is, the MAC address of the second device is a destination layer 2 identifier (Destination Layer 2 ID) of the second message.

In the second message, the address identifier and the error identifier of the second device are mainly carried in the second message in the following two manners.

Manner 1: The address identifier and the error identifier of the second device are carried in an application extension field in a DSA message frame of the second message.

Figure 7A:
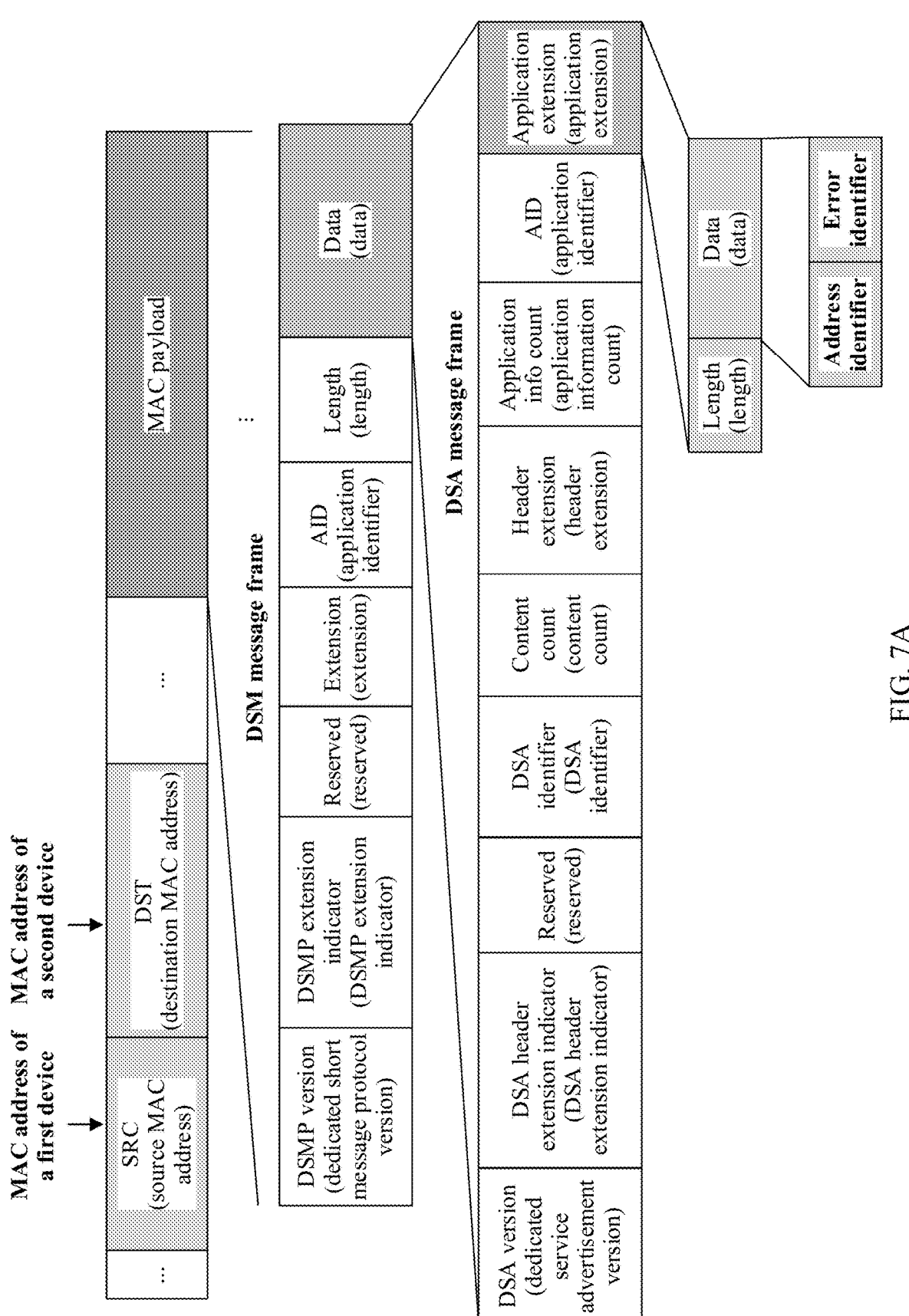
FIG. 7A is a schematic diagram of a second message according to an embodiment of this application.

FIG. 7A is a schematic diagram of the second message according to an embodiment of this application. In FIG. 7A, a source MAC address field of the second message carries a MAC address of the first device, that is, a source layer 2 identifier of the second message is the MAC address of the first device. The destination MAC address field of the second message carries the MAC address of the second device, that is, the destination layer 2 identifier of the second message is the MAC address of the second device. A MAC payload field of the second message may carry a dedicated short message (DSM) message frame. The DSM message frame includes a dedicated short message protocol version (DSMP Version) field, a DSMP extension indicator field, a reserved field, an extension field, an application identifier (AID) field, a length field, and a data field. When a value of the DSMP extension indicator field is 1, it indicates that a following extension field appears. When a value of the DSMP extension indicator field is 0, it indicates that no extension field appears. The reserved field may be used for function extension. The AID field is used to fill an application identifier to distinguish different applications. The length field indicates a byte length of a data entity of an application layer. The data field may carry a data entity of an application layer or a management sublayer. In FIG. 7A, a data field in the DSM message frame carries the DSA message frame. For details of each field in the DSA message frame, refer to the descriptions of the DSA message frame in FIG. 6A.

In the second message shown in FIG. 7A, the address identifier of the second device and the error identifier of the second device are carried in the application extension field in the DSA message frame of the second message. For example, a data data field may be newly defined in the application extension field to carry the address identifier and the error identifier of the second device.

Manner 2: The address identifier and the error identifier of the second device are carried in a header extension field in a DSA message frame of the second message.

Figure 7B:
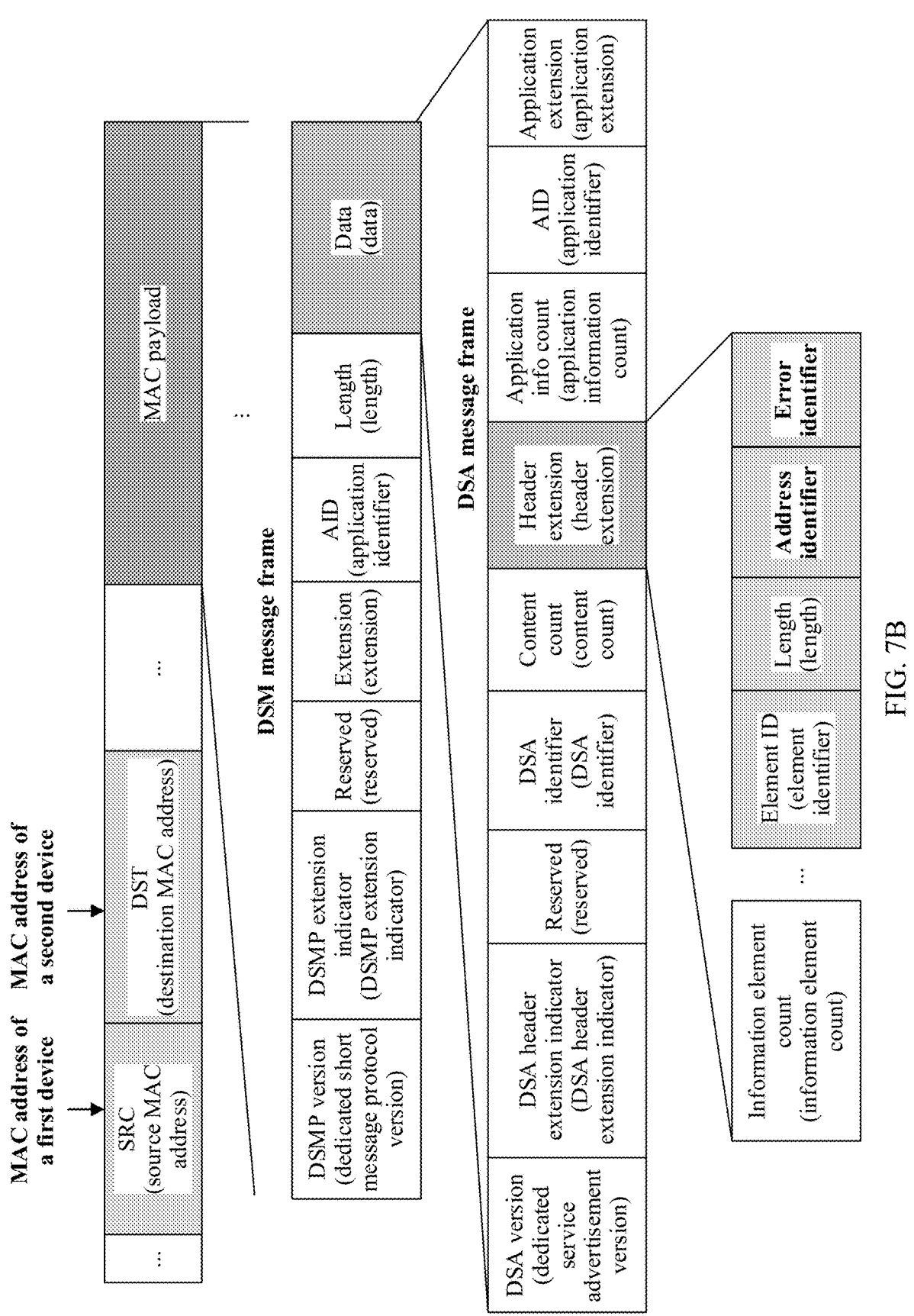
FIG. 7B is a schematic diagram of a second message according to an embodiment of this application.

FIG. 7B is a schematic diagram of the second message according to an embodiment of this application. In FIG. 7B, a source MAC address field of the second message carries a MAC address of the first device. The destination MAC address field of the second message carries the MAC address of the second device. A MAC payload field carries the DSM message frame. A data field in the DSM message frame carries the DSA message frame. For details of fields in the DSM message frame, refer to the related descriptions in FIG. 7A. For details of fields in the DSA message frame, refer to the related descriptions in FIG. 6A. Details are not described herein again.

In the second message shown in FIG. 7B, the address identifier of the second device and the error identifier of the second device are carried in the header extension field in the DSA message frame of the second message. For example, an information element is newly defined in the header extension field, and the information element is indicated by an element ID field, a length field, and a content field. The element ID field indicates an identifier of a unicast establishment abnormality, the length field indicates a length of content carried in the content field, and the content field carries the address identifier and the error identifier of the second device.

S204: The second device determines, based on the second message, that establishment of the unicast connection between the second device and the first device is abnormal, and performs an abnormality handling operation based on the error identifier carried in the second message.

In embodiments of this application, the second device receives the second message, learns that the second message carries one MAC address and one address identifier, and detects that the MAC address carried in the second message is the MAC address of the second device and the address identifier carried in the second message is the address identifier of the second device. In this case, it indicates that the second message carries the MAC address of the second device and the address identifier of the second device. Therefore, the second device determines that establishment of the unicast connection between the second device and the first device is abnormal.

In embodiments of this application, after determining that establishment of the unicast connection between the second device and the first device is abnormal, the second device performs the abnormality handling operation based on the error identifier carried in the second message.

In a specific implementation, that the second device performs an abnormality handling operation based on the error identifier carried in the second message is as follows: When the error identifier indicates that the conflict occurs in the MAC address of the second device, the second device reselects the MAC address of the second device. In some possible embodiments, if the address identifier of the second device is obtained based on the MAC address of the second device, because the MAC address of the second device is changed, the address identifier of the second device also needs to be changed. After reselecting the MAC address of the second device, the second device may further re-determine an address identifier of the second device.

In a specific implementation, that the second device performs an abnormality handling operation based on the error identifier carried in the second message is as follows: When the error identifier indicates that the security mechanism of the second device does not match the security mechanism supported by the first device, the second device reselects the security mechanism of the second device.

In some possible embodiments, that the second device performs an abnormality handling operation based on the error identifier carried in the second message may alternatively be as follows: When the error identifier indicates that the message structure of the first message sent by the second device is incorrect, the second device checks the message structure of the first message. In some possible embodiments, when the error identifier indicates that the conflict occurs in the MAC address of the second device and the security mechanism of the second device does not match the security mechanism supported by the first device, the second device reselects the MAC address of the second device and the security mechanism of the second device. The abnormality handling operation performed by the second device is not specifically limited in embodiments of this application.

In embodiments of this application, after the second device performs the abnormality handling operation based on the error identifier carried in the second message, the second device may re-request the first device to establish a unicast connection to the second device.

It can be learned that, in embodiments of this application, a responder may be identified based on a MAC address and an address identifier of the responder. The error identifier carried in the message may indicate the responder to effectively resolve a problem that establishment of a unicast connection between a sender and the responder is abnormal due to a MAC address conflict, mismatch of security mechanisms, or the like. This helps improve efficiency of establishing a unicast connection, and ensures normal execution of a unicast service between the two communication parties.

Figure 8:
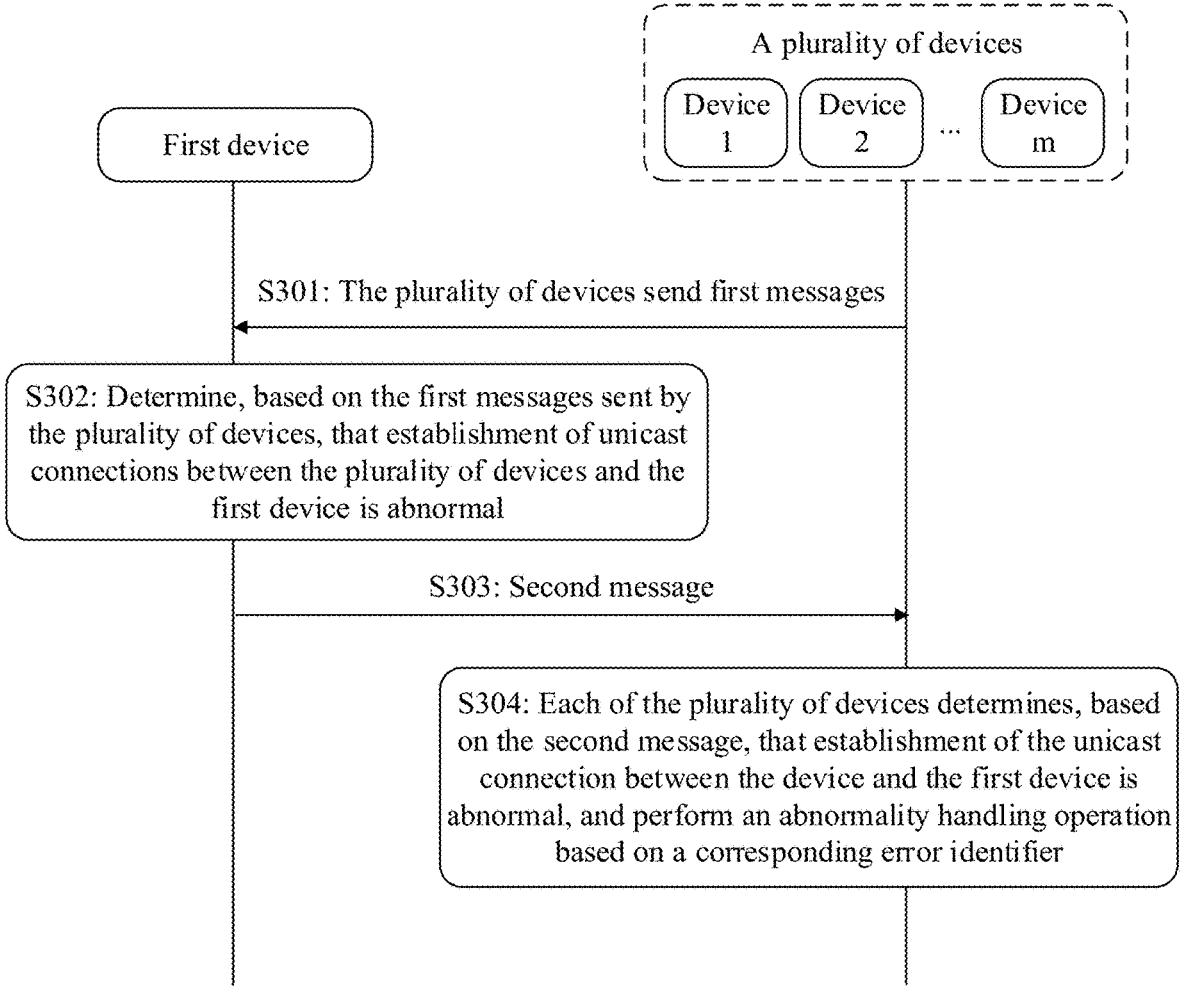
FIG. 8 is a flowchart of still another method for handling a unicast connection establishment abnormality according to an embodiment of this application.

FIG. 8 is still another method for handling a unicast connection establishment abnormality according to an embodiment of this application. In comparison with that in FIG. 5, in FIG. 8, a plurality of devices interact with a first device, which is also equivalent to that the second device in the embodiment in FIG. 4 includes a plurality of devices. The embodiment in FIG. 8 may be independent of the foregoing embodiments in FIG. 4 and FIG. 5, or may be a supplement to the foregoing embodiment in FIG. 4. The method includes but is not limited to the following steps.

S301: The plurality of devices send first messages to the first device.

In embodiments of this application, that the plurality of devices send first messages to the first device may be: Each of the plurality of devices sends one first message to the first device. That is, a quantity of first messages is the same as a quantity of the plurality of devices. The first message is used to request the first device to establish a unicast connection to the device. It should be noted that the plurality of devices may be a device 1, a device 2, . . . , or a device m in FIG. 8, where m is a positive integer greater than 1.

The device 1 in the plurality of devices is used as an example to describe the solutions. A first message sent by the device 1 to the first device is used to request the first device to establish a unicast connection to the device 1, and the first message sent by the device 1 carries a MAC address, an address identifier, and a security mechanism of the device 1. For a specific manner in which the MAC address, the address identifier, and the security mechanism of the device 1 are carried in the first message, refer to the related descriptions in S201 in the embodiment in FIG. 5. Details are not described herein again.

It should be noted that, for the first message sent by each of the plurality of devices, refer to the related descriptions of the first message sent by the device 1. Details are not described herein.

S302: The first device determines, based on the first messages sent by the plurality of devices, that establishment of unicast connections between the plurality of devices and the first device is abnormal.

In embodiments of this application, the first device determines, based on the first message sent by each of the plurality of devices, that establishment of the unicast connection between each of the plurality of devices and the first device is abnormal.

For each of the plurality of devices, the device 1 in the plurality of devices is used as an example. That is, the first device determines, based on the first message sent by the device 1, that establishment of a unicast connection between the device 1 and the first device is abnormal. For a specific process, refer to the related descriptions of S102 in the embodiment in FIG. 4 or S202 in the embodiment in FIG. 5. Details are not described herein again.

S303: The first device sends a second message to the plurality of device.

In embodiments of this application, the second message carries MAC addresses, address identifiers, and error identifiers of the plurality of devices (namely, the m devices), and the error identifier indicates a reason why establishment of the unicast connection is abnormal of a corresponding device. For example, the second message may be a broadcast message.

In embodiments of this application, the second message further includes a dedicated application identifier, the dedicated application identifier indicates that establishment of a unicast connection is abnormal, and the dedicated application identifier is carried in an AID field in a DSM message frame of the second message.

In the second message, a destination MAC address field of the second message carries a converted value of the dedicated application identifier.

In the second message, there are mainly the following two manners of a location at which the MAC addresses, the address identifiers, and the error identifiers of the plurality of devices are carried in the second message:

Manner 1: The MAC addresses, the address identifiers, and the error identifiers of the plurality of devices are carried in an application extension field in a DSA message frame of the second message.

Figure 9A:
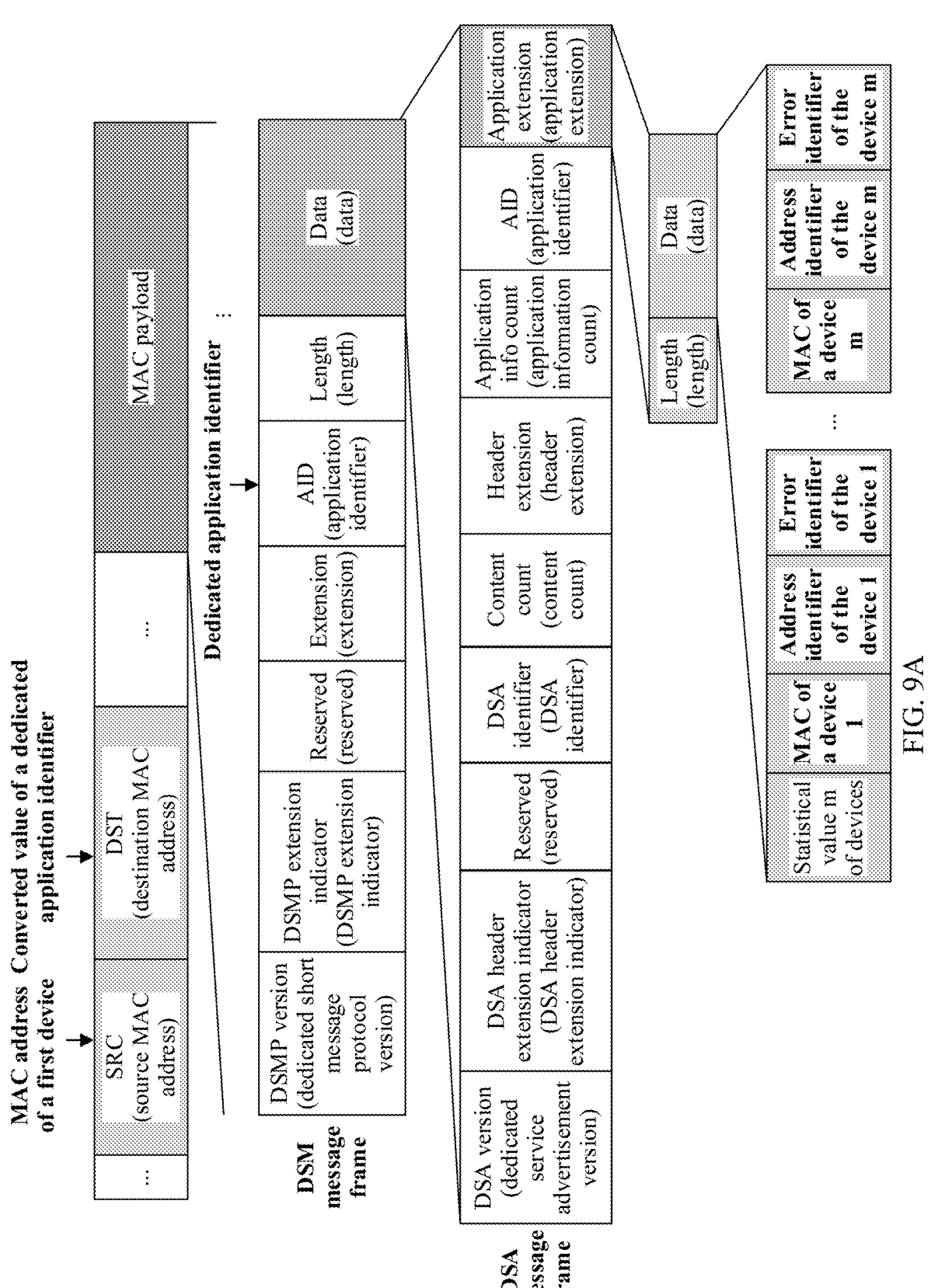
FIG. 9A is a schematic diagram of a second message according to an embodiment of this application.

FIG. 9A is a schematic diagram of the second message according to an embodiment of this application. In FIG. 9A, a source MAC address field of the second message carries a MAC address of the first device, a destination MAC address field of the second message carries the converted value of the dedicated application identifier, and a MAC payload field carries the DSM message frame. For details of the DSM message frame, refer to the related descriptions in FIG. 7A. The AID field in the DSM message frame carries the dedicated application identifier, and a data field in the DSM message frame carries the DSA message frame. For details of the DSA message frame, refer to the related descriptions in FIG. 6A. Details are not described herein again.

In the second message shown in FIG. 9A, the MAC addresses, the address identifiers, and the error identifiers of the plurality of devices are carried in the application extension field in the DSA message frame of the second message. For example, a data data field may be newly defined in the application extension field to carry the MAC addresses, the address identifiers, and the error identifiers of the plurality of devices, and carry a statistical value m of the devices. In FIG. 9A, the plurality of devices include the device 1, . . . , and the device m.

Manner 2: The MAC addresses, the address identifiers, and the error identifiers of the plurality of devices are carried in a header extension field in a DSA message frame of the second message.

Figure 9B:
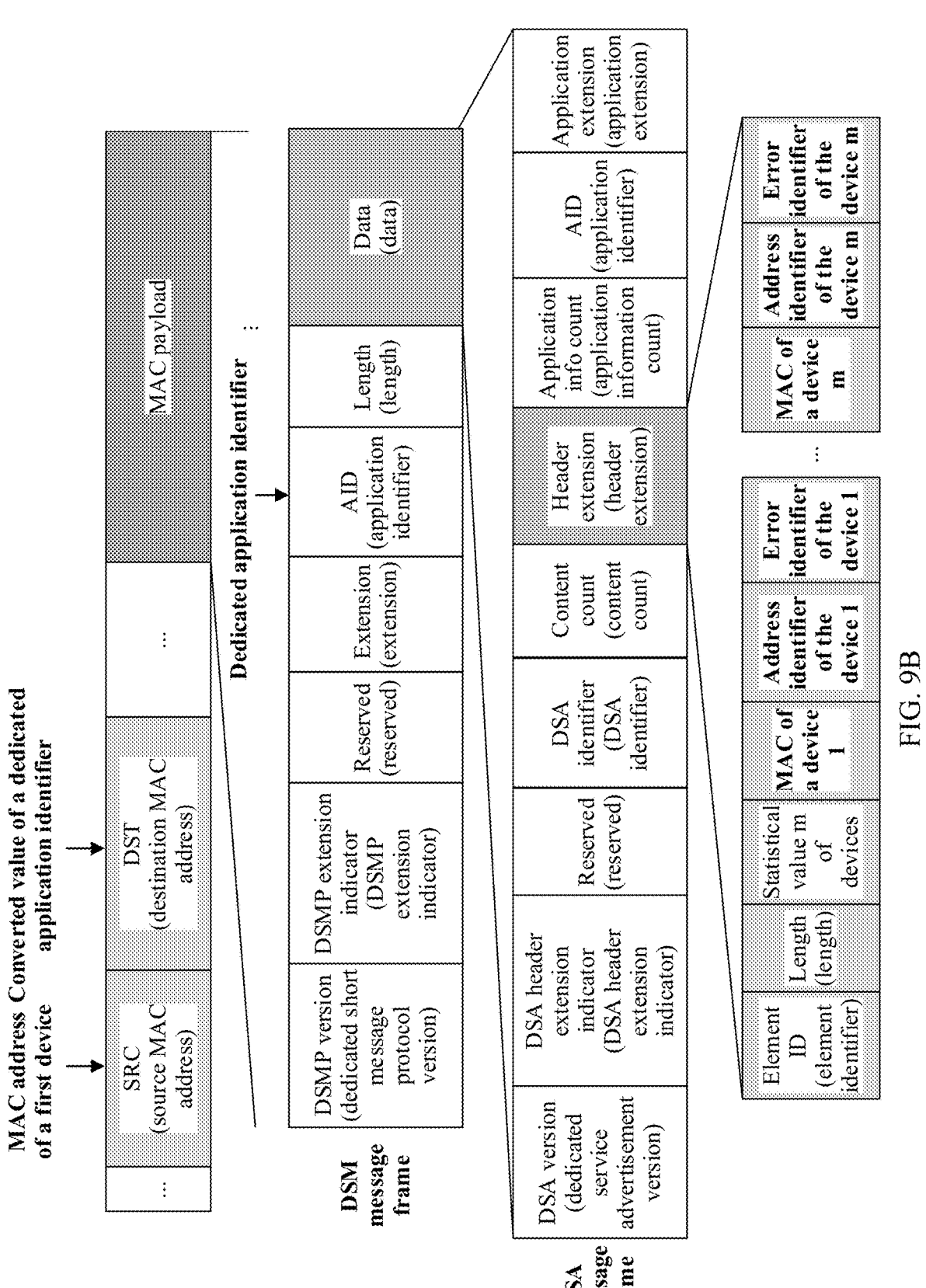
FIG. 9B is a schematic diagram of a second message according to an embodiment of this application.

FIG. 9B is a schematic diagram of the second message according to an embodiment of this application. In FIG. 9B, a source MAC address field of the second message carries a MAC address of the first device, a MAC payload field of the second message carries a DSM message frame, a destination MAC address field of the second message carries the converted value of the dedicated application identifier, an AID field in the DSM message frame of the second message carries the dedicated application identifier, and a data field in the DSM message frame carries the DSA message frame. For details of each field in the DSM message frame, refer to the related descriptions in FIG. 7A. For details of each field in the DSA message frame, refer to the related descriptions in FIG. 6A.

In the second message shown in FIG. 9B, the MAC addresses, the address identifiers, and the error identifiers of the plurality of devices are carried in the header extension field in the DSA message frame of the second message. For example, an information element is newly defined in the header extension field, and the information element is indicated by an element ID field, a length field, and a content field. The element ID field indicates an identifier of a unicast establishment abnormality, the length field indicates a length of content carried in the content field, and the content field carries the MAC addresses, the address identifiers, and the error identifiers of the plurality of devices. In addition, the content field may further carry a statistical value m of the devices. In FIG. 9B, the plurality of devices include the device 1, . . . , and the device m.

In some possible embodiments, when establishment of the unicast connections between the plurality of devices and the first device is abnormal, the first message may alternatively send a corresponding second message to each of the plurality of devices, and the second message corresponding to each device carries only a MAC address, an address identifier, and an error identifier of the device. In this case, the second message may be in a form shown in FIG. 7A or FIG. 7B.

S304: Each of the plurality of devices determines, based on the second message, that establishment of the unicast connection between the device and the first device is abnormal, and performs an abnormality handling operation based on the corresponding error identifier.

The device 1 in the plurality of devices is used as an example to describe this step.

After receiving the second message from the first device, the device 1 first determines that content carried in the destination MAC address field of the second message includes the converted value of the dedicated application identifier. That is, it is learned that the second message carries a plurality of MAC addresses, a plurality of address identifiers, and at least one error identifier. Further, the device 1 separately determines whether the plurality of MAC addresses carried in the second message include the MAC address of the device 1 and whether the plurality of address identifiers carried in the second message include the address identifier of the device 1. When the plurality of MAC addresses carried in the second message include the MAC address of the device 1 and the plurality of address identifiers carried in the second message include the address identifier of the device 1, the device 1 determines that establishment of the unicast connection between the device 1 and the first device is abnormal.

Because a mapping relationship exists among the MAC address, the address identifier, and the error identifier carried in the second message, when the device 1 determines that establishment of the unicast connection between the device 1 and the first device is abnormal, the device 1 obtains, based on the mapping relationship between the MAC address, the address identifier, and the error identifier, an error identifier corresponding to the device 1 from the second message, and the device 1 performs an abnormality handling operation based on the error identifier corresponding to the device 1. It should be noted that, for a specific process of performing the abnormality handling operation by the device 1, refer to the related descriptions of performing the abnormality handling operation by the second device in S204 in the embodiment in FIG. 5. Details are not described herein again.

In some possible embodiments, when the second message carries only one MAC address, one address identifier, and one error identifier, for a specific handling process of the device 1, refer to the related descriptions of S204 in the embodiment in FIG. 5.

It can be learned that, in embodiments of this application, a sender can effectively distinguish between different responders with a same MAC address based on address identifiers. When determining that establishment of unicast connections corresponding to a plurality of responders is abnormal, the sender may send a message carrying content such as address identifiers of the plurality of responders to notify each responder of a reason why establishment of the unicast connection is abnormal, so that the responder can perform corresponding handling. This effectively resolves a problem that establishment of the unicast connection between the sender and the responder is abnormal, reduces consumption of network resources, improves efficiency of establishing the unicast connection, and ensures normal execution of a service between the two communication parties.

The following describes application of the foregoing method by using a specific application scenario.

Figure 10:
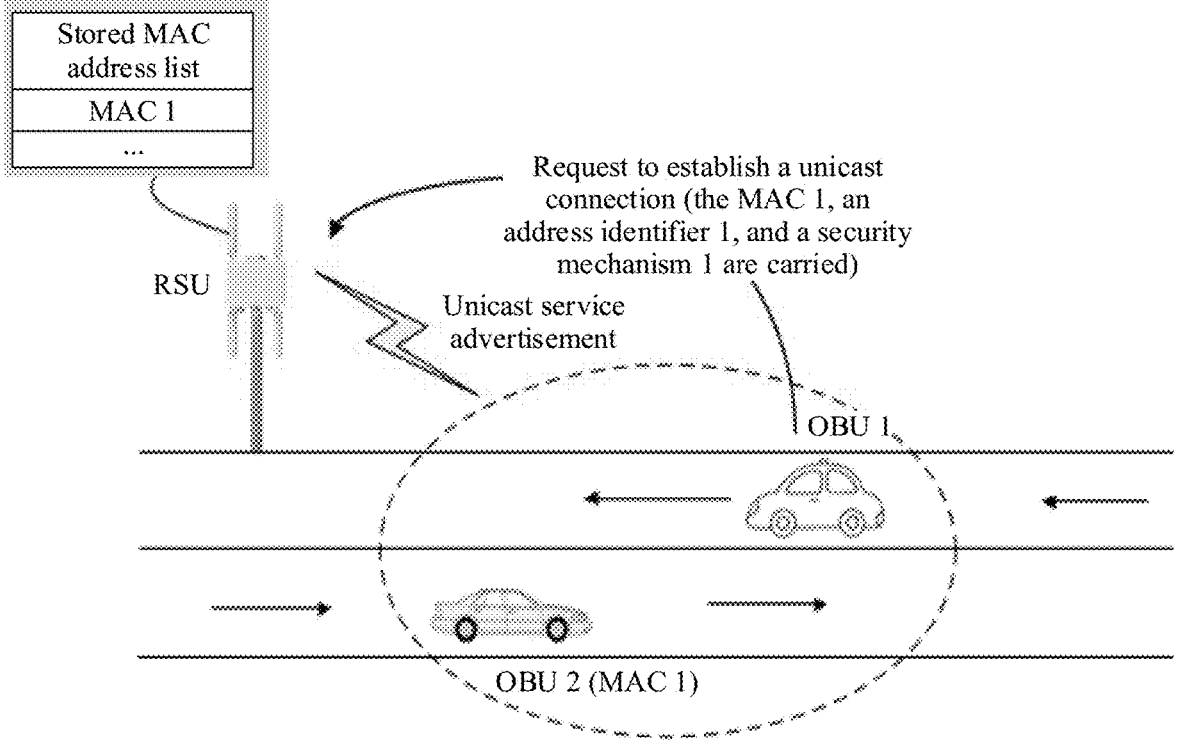
FIG. 10 is a schematic diagram of an expressway toll collection scenario according to an embodiment of this application.

FIG. 10 is a schematic diagram of an expressway toll collection scenario. In FIG. 10, an RSU is equivalent to the first device in FIG. 5, an OBU 1 is equivalent to the second device in FIG. 5, and an OBU 2 is equivalent to the foregoing third device. A MAC address of the OBU 2 and a MAC address of the OBU 1 are the same, and each are a MAC 1. An address identifier of the OBU 1 is an address identifier 1, and a security mechanism of the OBU 1 is a security mechanism 1.

It is assumed that the RSU broadcasts a unicast service advertisement used for a near field service application to the outside, the OBU 2 enters a broadcast range of the RSU before the OBU 1, the OBU 2 establishes a unicast connection to the RSU to complete one time of near field payment, and the RSU stores the MAC address (namely, the MAC 1) of the OBU 2. In a process in which the OBU 2 is moving away from the RSU, the OBU 1 enters the broadcast range of the RSU, responds to the received unicast service advertisement, and sends a first message to the RSU to request the RSU to establish a unicast connection to the OBU 1. The first message carries the MAC 1, the address identifier 1, and the security mechanism 1 of the OBU 1. The RSU detects, based on the first message, that the MAC 1 in a stored MAC address list is the same as the MAC address of the OBU 1, that is, a conflict occurs in the MAC address of the OBU 1. Therefore, the RSU determines that an error identifier of the OBU 1 is an error identifier 1. The error identifier 1 indicates that a MAC address conflict occurs, and triggers the RSU to send a second message. The second message carries the MAC 1, the address identifier 1, and the error identifier 1 of the OBU 1. After receiving the second message, the OBU 1 detects that a MAC address carried in the second message is the MAC 1 and an address identifier carried in the second message is the address identifier 1, that is, determines that establishment of the unicast connection between the OBU 1 and the RSU is abnormal. Further, it is learned, based on the error identifier carried in the second message, that a reason why establishment of the unicast connection is abnormal is the MAC address conflict. Therefore, the OBU 1 reselects the MAC address of the OBU 1, or reselects the MAC address and the address identifier of the OBU 1, and then responds to the unicast service advertisement from the RSU again. This improves efficiency of establishing the unicast connection.

Figure 11:
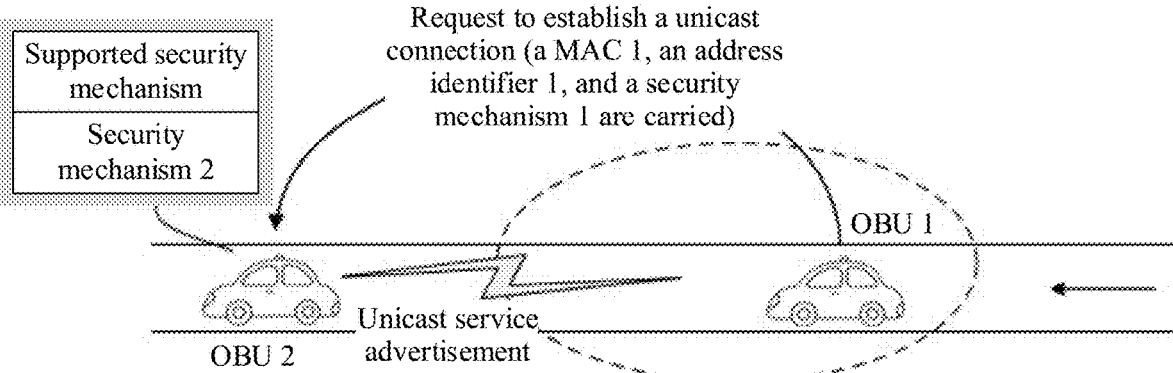
FIG. 11 is a schematic diagram of a vehicle-to-vehicle communication scenario according to an embodiment of this application.

FIG. 11 is a schematic diagram of a vehicle-to-vehicle communication scenario. In FIG. 11, an OBU 1 may be the device 1 in FIG. 8, and an OBU 2 is equivalent to the first device in FIG. 8. A MAC address of the OBU 1 is a MAC 1, an address identifier of the OBU 1 is an address identifier 1, and a security mechanism of the OBU 1 is a security mechanism 1. The OBU 2 supports a security mechanism 2, and the security mechanism 2 is different from the security mechanism 1.

It is assumed that the OBU 2 broadcasts a unicast service advertisement used for a traffic service application. The OBU 1 is within a broadcast range of the OBU 2. In response to the unicast service advertisement, the OBU 1 sends a first message to the OBU 2 to request the OBU 2 to establish a unicast connection to the OBU 1. The first message carries the MAC 1, the address identifier 1, and the security mechanism 1 of the OBU 1. The OBU 2 detects, based on the received first message, that the security mechanism 1 of the OBU 1 does not match the security mechanism (namely, the security mechanism 2) supported by the OBU 2, and determines that an error identifier of the OBU 1 is an error identifier 2. The error identifier 2 indicates that the security mechanism of the OBU 1 does not match the security mechanism supported by the OBU 2, and triggers the OBU 2 to send a second message. For example, the second message is a broadcast message, and the second message carries a plurality of MAC addresses, a plurality of address identifiers, and at least one error identifier. After receiving the second message, the OBU 1 detects that content carried in a destination MAC address field of the second message is a converted value of a dedicated application identifier. The dedicated application identifier indicates that establishment of a unicast connection is abnormal. Further, the OBU 1 detects that the plurality of MAC addresses carried in the second message include the MAC 1 of the OBU 1 and the plurality of address identifiers include the address identifier 1 of the OBU 1, and the OBU 1 determines that establishment of the unicast connection between the OBU 1 and the OBU 2 is abnormal. Further, the OBU 1 learns, from the second message, that the error identifier corresponding to the OBU 1 is the error identifier 2, and learns, based on the error identifier 2, that a reason why establishment of the unicast connection is abnormal is mismatch of the security mechanisms. Therefore, the OBU 1 reselects the security mechanism of the OBU 1, and then responds to the unicast service advertisement from the OBU 2 again. This improves efficiency of establishing the unicast connection, and ensures normal execution of a service between the two communication parties.

The methods in embodiments of this application are described in detail above, and apparatuses in embodiments of this application are provided below.

Figure 12:
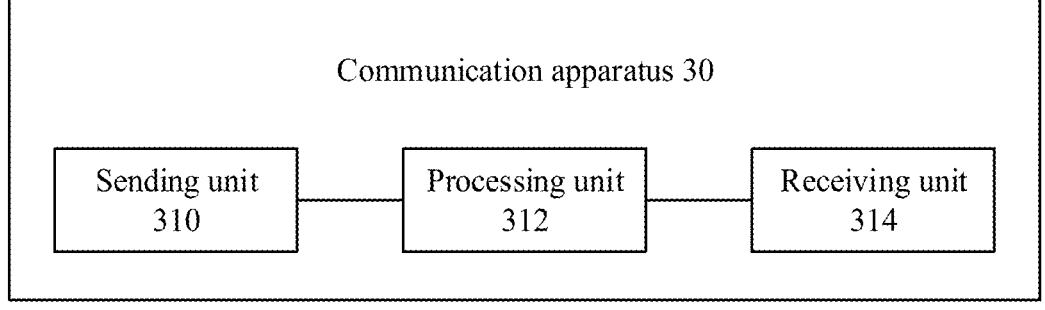
FIG. 12 is a schematic diagram of a functional structure of a communication apparatus according to an embodiment of this application.

FIG. 12 is a schematic diagram of a functional structure of a communication apparatus according to an embodiment of this application. A communication apparatus 30 includes a sending unit 310, a processing unit 312, and a receiving unit 314. The communication apparatus 30 may be implemented by using hardware, software, or a combination of software and hardware.

In a possible design, the communication apparatus 30 may be the first device in FIG. 4, FIG. 5, or FIG. 8. Specifically, the receiving unit 314 is configured to receive a first message sent by a second device. The first message is used to request the first device to establish a unicast connection to the second device, and the first message carries a first medium access control MAC address, an address identifier, and a security mechanism of the second device. The processing unit 312 is configured to determine, based on the first message, that establishment of the unicast connection between the second device and the first device is abnormal. The sending unit 310 is configured to send a second message to a second device. The second message carries the first MAC address, the address identifier, and an error identifier, and the error identifier indicates a reason why establishment of the unicast connection is abnormal.

In this case, the communication apparatus 30 may be configured to implement the method on the first device side described in the embodiment in FIG. 4. In the embodiment in FIG. 4, the receiving unit 314 and the processing unit 312 may be configured to perform S102, and the sending unit 310 may be configured to perform S103. The functional modules of the communication apparatus 30 may be further configured to implement the method on the first device side described in the embodiment in FIG. 5 or FIG. 8. For brevity of this specification, details are not described herein again.

In another possible design, the communication apparatus 30 may be the second device in FIG. 4 or FIG. 5 or any one of the plurality of devices shown in FIG. 8. Specifically, the sending unit 310 is configured to send a first message to a first device. The first message is used to request the first device to establish a unicast connection to a second device, and the first message carries a first medium access control MAC address, a first address identifier, and a security mechanism of the second device. The receiving unit 314 is configured to receive a second message sent by the first device. The second message carries at least one MAC address, at least one address identifier, and an error identifier, and the error identifier indicates a reason why establishment of the unicast connection is abnormal. The processing unit 312 is configured to determine, based on the second message, that establishment of the unicast connection between the second device and the first device is abnormal, and perform an abnormality handling operation based on the error identifier.

In this case, the communication apparatus 30 may be configured to implement the method on the second device side described in the embodiment in FIG. 4. In the embodiment in FIG. 4, the sending unit 310 may be configured to perform S101, and the receiving unit 314 and the processing unit 312 may be configured to perform S104. The functional modules of the communication apparatus 30 may be further configured to implement the method on the second device side described in the embodiment in FIG. 5 or the method on the plurality of device sides described in the embodiment in FIG. 8. For brevity of this specification, details are not described herein again.

Only one or more units in the embodiment shown in FIG. 12 may be implemented by software, hardware, firmware, or a combination thereof. The software or firmware includes but is not limited to computer program instructions or code, and may be executed by a hardware processor. The hardware includes but is not limited to various types of integrated circuits, such as a central processing unit (CPU, a digital signal processor (DSP), a field programmable gate array (FPGA), or an application specific integrated circuit (ASIC).

Figure 13:
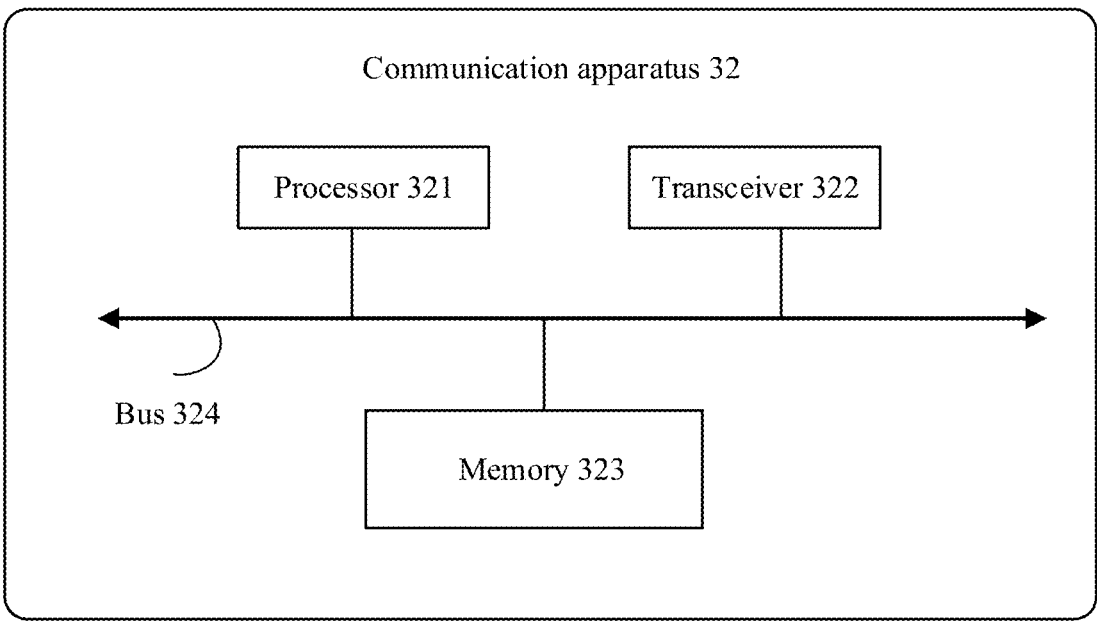
FIG. 13 is a schematic diagram of a structure of a communication apparatus according to an embodiment of this application.

FIG. 13 is a schematic diagram of a structure of a communication apparatus according to an embodiment of this application. As shown in FIG. 13, a communication apparatus 32 includes a processor 321, a transceiver 322, a memory 323, and a bus 324. In a specific implementation, the processor 321, the memory 323, and the transceiver 322 communicate with each other through the bus 324. It should be understood that a quantity of processors and memories in the communication apparatus 32 is not limited in this application.

In a possible design, the communication apparatus 32 may be the first device in the embodiment in FIG. 4, FIG. 5, or FIG. 8. The first device may be a road side apparatus, for example, a road side unit (RSU), multi-access edge computing (MEC), a smart gas station, or a smart signal light. For another example, the communication apparatus 32 may alternatively be a system including an RSU and MEC, or a system including an RSU and a sensor, or a system including an RSU, MEC, and a sensor. Alternatively, the first device may be a terminal, for example, an on board unit (OBU), a portable mobile device (for example, a mobile phone or a tablet), or another sensor or device that has a communication function, for example, a component or a chip in a portable mobile device. This is not specifically limited in embodiments of this application.

In another possible design, the communication apparatus 32 may be the second device in FIG. 4 or FIG. 5 or any one of the plurality of devices shown in FIG. 8. The second device or any one of the plurality of devices shown in FIG. 8 may be an on board unit (OBU), a smart gas station, a smart signal light, a portable mobile device (for example, a mobile phone or a tablet), or another sensor or device that has a communication function, for example, a component or a chip in a portable mobile device. This is not specifically limited in embodiments of this application.

The bus 324 may be a peripheral component interconnect (PCI) bus, an extended industry standard architecture (EISA) bus, and or the like. Buses may be classified into an address bus, a data bus, a control bus, and the like. For ease of indication, the bus is indicated by only one line in FIG. 13. However, this does not indicate that there is only one bus or only one type of bus. The bus 324 may be included in a channel on which information is transmitted between the components (for example, the memory 323, the processor 321, and the transceiver 322) of the communication apparatus 32.

The processor 321 may include any one or more of processors such as a central processing unit (CPU), a microprocessor (MP), or a digital signal processor (DSP).

The memory 323 is configured to provide storage space, and the storage space may store data such as an operating system and a computer program. The memory 323 may be one or a combination of a plurality of a random access memory (RAM), an erasable programmable read only memory (EPROM), a read-only memory (ROM), a compact disc read-only memory (CD-ROM), or the like. The memory 323 may exist independently, or may be integrated inside the processor 321.

The transceiver 322 may be configured to provide information input or output for the processor 321. Alternatively, the transceiver 322 may be configured to receive data sent from the outside and/or send data to the outside, and may be a wired link interface including an Ethernet cable or the like, or may be a wireless link (for example, Wi-Fi, Bluetooth, universal wireless transmission, and an in-vehicle short-range communication technology) interface. Alternatively, the transceiver 322 may further include a transmitter (for example, a radio frequency transmitter or an antenna) coupled to an interface, a receiver, or the like.

In a specific implementation, when the communication apparatus 32 is the foregoing first device, the processor 321 in the communication apparatus 32 is configured to read the computer program stored in the memory 323, to perform the method on the first device side described in the embodiment in FIG. 4, FIG. 5, or FIG. 8.

In a possible design, the communication apparatus 32 may be one or more modules in the first device that performs the method shown in FIG. 4, and the processor 321 may be configured to read one or more computer programs stored in the memory 323, to perform the following operations:

receiving, by using the receiving unit 314, a first message sent by the second device, where the first message is used to request the first device to establish a unicast connection to the second device, and the first message carries a first medium access control MAC address, an address identifier, and a security mechanism of the second device; determining, based on the first message, that establishment of the unicast connection between the second device and the first device is abnormal; and sending a second message to the second device by using the sending unit 310, where the second message carries the first MAC address, the address identifier, and an error identifier, and the error identifier indicates a reason why establishment of the unicast connection is abnormal.

In another specific implementation, when the communication apparatus 32 is the foregoing second device, the processor 321 in the communication apparatus 32 is configured to read the computer program stored in the memory 323, to perform the method on the second device side described in the embodiment in FIG. 4 or FIG. 5 or the method on the plurality of device sides described in the embodiment in FIG. 8.

In a possible design, the communication apparatus 32 may be one or more modules in the second device that performs the method shown in FIG. 4, and the processor 321 may be configured to read one or more computer programs stored in the memory 323, to perform the following operations:

sending a first message to the first device by using the sending unit 310, where the first message is used to request the first device to establish a unicast connection to a second device, and the first message carries a first medium access control MAC address, a first address identifier, and a security mechanism of the second device; receiving, by using the receiving unit 314, a second message sent by the first device, where the second message carries at least one MAC address, at least one address identifier, and an error identifier, and the error identifier indicates a reason why establishment of the unicast connection is abnormal; and determining, based on the second message, that establishment of the unicast connection between the second device and the first device is abnormal, and performing an abnormality handling operation based on the error identifier.

An embodiment of this application further provides a vehicle. The vehicle includes the foregoing first device or the foregoing second device. In a specific implementation, the vehicle may be configured to perform the method on the first device side described in the embodiment in FIG. 4, FIG. 5, or FIG. 8. In another specific implementation, the vehicle may be configured to perform the method on the second device side described in the embodiment in FIG. 4 or FIG. 5, or the method on the plurality of device sides described in the embodiment in FIG. 8.

An embodiment of this application further provides a system for handling a unicast connection establishment abnormality. The system includes the foregoing first device or the foregoing second device. The system is configured to perform the method described in the foregoing embodiments of this application.

The first device may be a road side unit (RSU), multi-access edge computing (MEC), an on board unit (OBU), a smart gas station, a smart signal light, a portable mobile device (for example, a mobile phone or a tablet), or another sensor or device that has a communication function, for example, a component or a chip in a portable mobile device. For another example, the first device may alternatively be a system including an RSU and MEC, or a system including an RSU and a sensor, or a system including an RSU, MEC, and a sensor.

The second device may be an on board unit, a smart gas station, a smart signal light, a portable mobile device (for example, a mobile phone or a tablet), or another sensor or device that has a communication function, for example, a component or a chip in a portable mobile device. This is not specifically limited in embodiments of this application.

In the foregoing embodiments in this specification, the description of each embodiment has respective focuses. For a part that is not described in detail in an embodiment, refer to the related descriptions in other embodiments.

It should be noted that a person of ordinary skill in the art may see that, all or a part of the steps in each method of the foregoing embodiments may be implemented by a program instructing related hardware. The program may be stored in a computer-readable storage medium. The storage medium includes a read-only memory (ROM), a random access memory (RAM), a programmable read-only memory (PROM), an erasable programmable read-only memory (EPROM), a one-time programmable read-only memory (OTPROM), an electrically-erasable programmable read-only memory (EEPROM), a compact disc read-only memory (CD-ROM), or another optical disk memory, magnetic disk memory, magnetic tape memory, or any other computer-readable medium that can be configured to carry or store data.

The technical solutions of this application essentially, or the part contributing to the conventional technology, or all or some of the technical solutions may be implemented in a form of a software product. A computer program product is stored in a storage medium and includes several instructions for indicating a device (which may be a personal computer, a server, or a network device, a robot, a single-chip micro-computer, a chip, a robot, or the like) to perform all or some of the steps of the methods described in embodiments of this application.

What is claimed is:

1. A method for handling a unicast connection establishment abnormality, applied to a first device, the method comprising:

receiving a first message sent by a second device, wherein the first message is used to request the first device to establish a unicast connection to the second device, and the first message carries a first medium access control (MAC) address, an address identifier, and a security mechanism of the second device;

determining, based on the first message, that establishment of the unicast connection between the second device and the first device is abnormal; and sending a second message to the second device, wherein the second message carries the first MAC address, the address identifier, and an error identifier, and the error identifier indicates a reason why establishment of the unicast connection is abnormal,

wherein the determining, based on the first message, that establishment of the unicast connection between the second device and the first device is abnormal comprises:
determining, based on a determining result indicating that the first MAC address is the same as a second MAC address of a third device, that establishment of the unicast connection between the second device and the first device is abnormal, wherein the third device is a device that requests to establish a unicast connection to the first device;
determining, based on a determining result indicating that the security mechanism does not match a security mechanism supported by the first device, that establishment of the unicast connection between the second device and the first device is abnormal; or
determining, based on a determining result indicating that a message structure of the first message is incorrect, that establishment of the unicast connection between the second device and the first device is abnormal.

2. The method according to claim 1, wherein the second device is one device, the first MAC address is one MAC address, and that the second message carries the first MAC address comprises:
the first MAC address is carried in a destination MAC address field of the second message.

3. The method of claim 2, wherein
the address identifier and the error identifier are carried in a header extension field in a dedicated service advertisement (DSA) message frame of the second message; or
the address identifier and the error identifier are carried in an application extension field in a DSA message frame of the second message.

4. The method of claim 1, wherein the second device comprises a plurality of devices, the first MAC address comprises a plurality of MAC addresses, the second message further comprises a dedicated application identifier indicating that establishment of the unicast connection is abnormal, the dedicated application identifier is carried in an application identifier (AID) field in a dedicated short message (DSM) message frame of the second message, and a destination MAC address field of the second message carries a converted value of the dedicated application identifier.

5. The method of claim 4, wherein that the second message carries the first MAC address, the address identifier, and an error identifier comprises:
the first MAC address, the address identifier, and the error identifier are carried in a header extension field in a dedicated service advertisement (DSA) message frame of the second message; or
the first MAC address, the address identifier, and the error identifier are carried in an application extension field in a DSA message frame of the second message.

6. The method of claim 1, wherein in the first message, the address identifier of the second device is carried in at least one of a dedicated service advertisement (DSA) identifier field or a content count field in a DSA message frame of the first message.

7. The method according to claim 1, wherein in the first message, the address identifier of the second device is carried in a header extension field of a dedicated service advertisement (DSA) message frame of the first message.

8. A method for handling a unicast connection establishment abnormality, applied to a second device, the method comprising:

sending a first message to a first device, wherein the first message is used to request the first device to establish a unicast connection to the second device, and the first message carries a first medium access control (MAC) address, a first address identifier, and a security mechanism of the second device;
receiving a second message sent by the first device, wherein the second message carries at least one MAC address, at least one address identifier, and an error identifier indicating a reason why establishment of the unicast connection is abnormal;
determining, based on the second message, that establishment of the unicast connection between the second device and the first device is abnormal; and
performing an abnormality handling operation based on the error identifier,
wherein the second message further comprises a dedicated application identifier indicating that establishment of the unicast connection is abnormal, the dedicated application identifier is carried in an application identifier (AID) field in a dedicated short message (DSM) message frame of the second message, and
wherein the determining, based on the second message, that establishment of the unicast connection between the second device and the first device is abnormal comprises:
when content carried in a destination MAC address field of the second message comprises a converted value of the dedicated application identifier, the at least one MAC address comprises the first MAC address, and the at least one address identifier comprises the first address identifier, determining that establishment of the unicast connection between the second device and the first device is abnormal.

9. The method of claim 8, wherein the performing the abnormality handling operation based on the error identifier comprises:
reselecting the first MAC address when the error identifier indicates that a conflict occurs in the first MAC address.

10. The method of claim 8, wherein the performing the abnormality handling operation based on the error identifier comprises:
reselecting the security mechanism when the error identifier indicates that the security mechanism does not match a security mechanism supported by the first device.

11. The method of claim 8, wherein the determining, based on the second message, that establishment of the unicast connection between the second device and the first device is abnormal comprises:
when the at least one MAC address is the first MAC address and the at least one address identifier is the first address identifier, determining that establishment of the unicast connection between the second device and the first device is abnormal.

12. The method of claim 11, wherein that the second message carries at least one MAC address, the at least one address identifier, and the error identifier comprises:
the at least one MAC address is carried in a destination MAC address field of the second message; and
the at least one address identifier and the error identifier are carried in a header extension field in a dedicated service advertisement (DSA) message frame of the second message, or the at least one address identifier and the error identifier are carried in an application extension field in a DSA message frame of the second message.

13. The method of claim 8, wherein that the second message carries at least one MAC address, the at least one address identifier, and the error identifier comprises:

the at least one MAC address, the at least one address identifier, and the error identifier are carried in a header extension field in a dedicated service advertisement (DSA) message frame of the second message; or the at least one MAC address, the at least one address identifier, and the error identifier are carried in an application extension Application Extension field in a DSA message frame of the second message.

14. The method of claim 8, wherein in (DSA) of the first message, the first address identifier is carried in at least one of a dedicated service advertisement (DSA) identifier field or a content count field in a DSA message frame of the first message.

15. The method according to claim 8, wherein in the first message, the first address identifier is carried in a header extension field of a dedicated service advertisement (DSA) message frame of the first message.

16. An apparatus comprising:

at least one processor; and one or more memories coupled to the at least one processor and storing programming instructions that, when executed by the at least one processor, cause the apparatus to:

receive a first message sent by a second device, wherein the first message is used to request a first device to establish a unicast connection to the second device, and the first message carries a first medium access control (MAC) address, an address identifier, and a security mechanism of the second device;

determine, based on the first message, that establishment of the unicast connection between the second device and the first device is abnormal;

send a second message to the second device, wherein the second message carries the first MAC address, the address identifier, and an error identifier indicating a reason why establishment of the unicast connection is abnormal, wherein the programming instructions, when executed by the at least one processor, further cause the apparatus to:

determine, based on a determining result indicating that the first MAC address is the same as a second MAC address of a third device, that establishment of the unicast connection between the second device and the first device is abnormal, wherein the third device is a device that requests to establish a unicast connection to the first device;

determine, based on a determining result indicating that the security mechanism does not match a security mechanism supported by the first device, that establishment of the unicast connection between the second device and the first device is abnormal; or determine, based on a determining result indicating that a message structure of the first message is incorrect, that establishment of the unicast connection between the second device and the first device is abnormal.

17. The apparatus according to claim 16, wherein the second device is one device, the first MAC address is one MAC address, and that the second message carries the first MAC address comprises:

the first MAC address is carried in a destination MAC address field of the second message.

18. The apparatus according to claim 17, wherein that the second message carries the address identifier and an error identifier comprises:

the address identifier and the error identifier are carried in a header extension field in a dedicated service advertisement (DSA) message frame of the second message; or the address identifier and the error identifier are carried in an application extension field in a DSA message frame of the second message.

19. The apparatus of claim 16, wherein the second device comprises a plurality of devices, the first MAC address comprises a plurality of MAC addresses, the second message further comprises a dedicated application identifier indicating that establishment of the unicast connection is abnormal, the dedicated application identifier is carried in an application identifier (AID) field in a dedicated short message (DSM) message frame of the second message, and a destination MAC address field of the second message carries a converted value of the dedicated application identifier.

20. The apparatus of claim 19, wherein that the second message carries the first MAC address, the address identifier, and the error identifier comprises:

the first MAC address, the address identifier, and the error identifier are carried in a header extension field in a dedicated service advertisement (DSA) message frame of the second message; or the first MAC address, the address identifier, and the error identifier are carried in an application extension field in a DSA message frame of the second message.

21. The apparatus of claim 16, wherein in a of the first message, the address identifier of the second device is carried in at least one of a dedicated service advertisement (DSA) identifier field or a content count field in a DSA message frame of the first message.

22. The apparatus according to claim 16, wherein in the first message, the address identifier of the second device is carried in a header extension field of a dedicated service advertisement DSA message frame of the first message.

23. An apparatus, comprising:

at least one processor; and one or more memories coupled to the at least one processor and storing programming instructions that, when executed by the at least one processor, cause the apparatus to:

send a first message to a first device, wherein the first message is used to request the first device to establish a unicast connection to a second device, and the first message carries a first medium access control (MAC) address, a first address identifier, and a security mechanism of the second device;

receive a second message sent by the first device, wherein the second message carries at least one MAC address, at least one address identifier, and an error identifier indicating a reason why establishment of the unicast connection is abnormal;

determine, based on the second message, that establishment of the unicast connection between the second device and the first device is abnormal; and perform an abnormality handling operation based on the error identifier, wherein the second message further comprises a dedicated application identifier indicating that establishment of the unicast connection is abnormal, the dedicated application identifier is carried in an application identifier (AID) field in a dedicated short message (DSM) message frame of the second message, and wherein the programming instructions, when executed by the at least one processor, cause the apparatus to:

when content carried in a destination MAC address field of the second message comprises a converted value of the dedicated application identifier, the at least one MAC address comprises the first MAC address, and the at least one address identifier comprises the first address identifier, determine that establishment of the unicast connection between the second device and the first device is abnormal.

24. The apparatus of claim 23, wherein the programming instructions, when executed by the at least one processor, cause the apparatus to:

reselect the first MAC address when the error identifier indicates that a conflict occurs in the first MAC address.

25. The apparatus of claim 23, wherein the programming instructions, when executed by the at least one processor, cause the apparatus to:

reselect the security mechanism when the error identifier indicates that the security mechanism does not match a security mechanism supported by the first device.

26. The apparatus of claim 23, wherein the programming instructions, when executed by the at least one processor, cause the apparatus to:

when the at least one MAC address is the first MAC address and the at least one address identifier is the first address identifier, determine that establishment of the unicast connection between the second device and the first device is abnormal.

27. The apparatus of claim 26, wherein that the second message carries at least one MAC address, the at least one address identifier, and the error identifier comprises:

the at least one MAC address is carried in a destination MAC address field of the second message; and the at least one address identifier and the error identifier are carried in a header extension field in a dedicated service advertisement (DSA) message frame of the second message, or the at least one address identifier and the error identifier are carried in an application extension field in a DSA message frame of the second message.

28. The apparatus of claim 23, wherein that the second message carries at least one MAC address, the at least one address identifier, and the error identifier comprises:

the at least one MAC address, the at least one address identifier, and the error identifier are carried in a header extension field in a dedicated service advertisement (DSA) message frame of the second message; or the at least one MAC address, the at least one address identifier, and the error identifier are carried in an application extension Application Extension field in a DSA message frame of the second message.

29. The apparatus according to claim 23, wherein in the first message, the first address identifier is carried in at least one of a dedicated service advertisement (DSA) identifier field, a content count field in a DSA message frame of the first message.

30. The apparatus according to claim 23, wherein in the first message, the first address identifier is carried in a header extension field of a dedicated service advertisement (DSA) message frame of the first message.

* * * * *